United States Patent
Sethi et al.

(10) Patent No.: US 10,448,287 B2
(45) Date of Patent: Oct. 15, 2019

(54) METHODS AND DEVICES FOR CIRCUIT-SWITCHED FALLBACK PROCEDURES

(71) Applicant: Intel IP Corporation, Santa Clara, CA (US)

(72) Inventors: Anuj Sethi, Nuremberg (DE); Manas Behera, Nuremberg (DE)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/480,410

(22) Filed: Apr. 6, 2017

(65) Prior Publication Data

US 2017/0332287 A1    Nov. 16, 2017

(30) Foreign Application Priority Data

May 10, 2016    (EP) .................................... 16168941

(51) Int. Cl.
*H04W 36/00*    (2009.01)
*H04W 36/36*    (2009.01)

(52) U.S. Cl.
CPC ... *H04W 36/0022* (2013.01); *H04W 36/0094* (2013.01); *H04W 36/36* (2013.01)

(58) Field of Classification Search
CPC .............. H04L 12/5692; H04W 36/00; H04W 36/0005; H04W 36/0022; H04W 36/0094; H04W 36/14; H04W 36/16; H04W 36/30; H04W 76/10; H04W 88/06
See application file for complete search history.

(56) References Cited

U.S. PATENT DOCUMENTS

| | | | | |
|---|---|---|---|---|
| 8,072,933 B2* | 12/2011 | Marinescu | ........ | H04W 36/0022 370/331 |
| 8,306,537 B2* | 11/2012 | Burbidge | .......... | H04W 36/0088 455/436 |
| 8,359,033 B2* | 1/2013 | Diachina | .......... | H04W 36/0066 455/436 |

(Continued)

FOREIGN PATENT DOCUMENTS

| EP | 2443869 A1 | 4/2012 |
|---|---|---|
| EP | 2732659 A1 | 5/2014 |

(Continued)

OTHER PUBLICATIONS

The Extended European Search Report based on Application No. 16168941.9 (10 Pages) dated Nov. 4, 2016 (Reference Purpose Only).

(Continued)

*Primary Examiner* — Eric Nowlin
(74) *Attorney, Agent, or Firm* — Viering, Jentschura & Partner MBB

(57) ABSTRACT

A radio communication device may include a measurement circuit configured to perform radio measurement to identify one or more cells of a combined CS-PS network in anticipation of circuit-switched orders, and a control circuit configured to identify a pending circuit-switched order supported by the combined CS-PS network while attached to a current network, and switch from the current network to the combined CS-PS network to engage in the pending circuit-switched using a selected cell of the one or more cells.

25 Claims, 9 Drawing Sheets

(56) References Cited

U.S. PATENT DOCUMENTS

| | | | | |
|---|---|---|---|---|
| 8,457,070 B2* | 6/2013 | Park | | H04W 36/0066 370/331 |
| 8,526,949 B2* | 9/2013 | Dwyer | | H04W 36/0061 455/435.2 |
| 8,619,608 B2* | 12/2013 | Sebire | | H04W 36/0085 370/252 |
| 8,620,300 B2* | 12/2013 | Bergqvist | | H04J 11/0093 455/422.1 |
| 8,842,633 B2* | 9/2014 | Dwyer | | H04W 36/0066 370/331 |
| 8,861,433 B2* | 10/2014 | Burbidge | | H04W 36/0022 370/328 |
| 8,934,356 B2* | 1/2015 | Casati | | H04W 36/0022 370/252 |
| 8,953,555 B2* | 2/2015 | Lee | | H04W 36/0022 370/331 |
| 9,094,937 B2* | 7/2015 | Nader | | H04W 72/005 |
| 9,143,988 B2* | 9/2015 | Diachina | | H04W 36/0066 |
| 9,288,735 B2* | 3/2016 | Kim | | H04W 36/30 |
| 9,332,461 B2* | 5/2016 | Han | | H04W 36/30 |
| 9,374,701 B2* | 6/2016 | Persson | | H04W 8/08 |
| 9,560,553 B2* | 1/2017 | Dwyer | | H04W 36/0066 |
| 9,622,118 B2* | 4/2017 | Melin | | H04W 36/0022 |
| 9,736,742 B2* | 8/2017 | Centonza | | H04W 24/02 |
| 9,749,915 B2* | 8/2017 | Singh | | H04W 36/00837 |
| 9,763,171 B2* | 9/2017 | Persson | | H04W 8/08 |
| 9,872,221 B2* | 1/2018 | Dahlen | | H04W 36/30 |
| 9,877,271 B2* | 1/2018 | Su | | H04W 48/16 |
| 9,918,253 B2* | 3/2018 | Jeong | | H04W 36/0022 |
| 9,949,312 B2* | 4/2018 | Lu | | H04W 24/10 |
| 9,973,977 B2* | 5/2018 | Diachina | | H04W 36/0066 |
| 2006/0239229 A1* | 10/2006 | Marinescu | | H04W 36/0022 370/331 |
| 2007/0287459 A1* | 12/2007 | Diachina | | H04W 36/0066 455/436 |
| 2008/0267128 A1* | 10/2008 | Bennett | | H04W 36/0022 370/331 |
| 2010/0278142 A1* | 11/2010 | Dwyer | | H04W 36/0066 370/331 |
| 2010/0304749 A1* | 12/2010 | Dwyer | | H04W 36/0061 455/443 |
| 2010/0316000 A1* | 12/2010 | Burbidge | | H04W 36/0022 370/328 |
| 2010/0317347 A1* | 12/2010 | Burbidge | | H04W 36/0088 455/436 |
| 2010/0317375 A1* | 12/2010 | Burbidge | | H04W 36/0022 455/458 |
| 2011/0002305 A1* | 1/2011 | Park | | H04W 36/0066 370/331 |
| 2011/0158121 A1* | 6/2011 | Casati | | H04W 36/0022 370/252 |
| 2012/0120789 A1 | 5/2012 | Ramachandran et al. | | |
| 2012/0122459 A1* | 5/2012 | Wu | | H04W 36/0022 455/437 |
| 2012/0157071 A1* | 6/2012 | Pudney | | H04W 36/0022 455/418 |
| 2013/0107865 A1* | 5/2013 | Diachina | | H04W 36/0066 370/331 |
| 2014/0036668 A1* | 2/2014 | Niemi | | H04L 47/28 370/230 |
| 2014/0051443 A1* | 2/2014 | Diachina | | H04W 36/0022 455/436 |
| 2014/0071951 A1* | 3/2014 | Liu | | H04W 52/0254 370/332 |
| 2014/0126535 A1* | 5/2014 | Diachina | | H04W 36/14 370/331 |
| 2014/0179319 A1* | 6/2014 | Kim | | H04W 36/30 455/436 |
| 2014/0242993 A1* | 8/2014 | Dahlen | | H04W 36/30 455/436 |
| 2014/0269611 A1* | 9/2014 | Ionescu | | H04W 36/0022 370/331 |
| 2014/0349662 A1* | 11/2014 | Ekici | | H04W 76/16 455/450 |
| 2015/0036611 A1* | 2/2015 | Kim | | H04W 36/0022 370/329 |
| 2015/0056990 A1* | 2/2015 | Persson | | H04W 8/08 455/434 |
| 2015/0057003 A1* | 2/2015 | Dwyer | | H04W 36/0066 455/437 |
| 2015/0087308 A1* | 3/2015 | Jeong | | H04W 36/0022 455/436 |
| 2015/0092709 A1* | 4/2015 | Su | | H04W 48/16 370/329 |
| 2015/0117401 A1* | 4/2015 | Jiang | | H04W 76/18 370/331 |
| 2015/0146685 A1* | 5/2015 | Han | | H04W 36/30 370/331 |
| 2015/0208285 A1* | 7/2015 | Liao | | H04W 36/0022 370/332 |
| 2015/0282011 A1* | 10/2015 | Watfa | | H04W 36/0022 370/332 |
| 2015/0296422 A1* | 10/2015 | Melin | | H04W 36/0022 370/331 |
| 2015/0358879 A1* | 12/2015 | Diachina | | H04W 36/0066 370/332 |
| 2015/0373603 A1* | 12/2015 | Jung | | H04W 36/22 370/331 |
| 2016/0057661 A1* | 2/2016 | Nayak | | H04W 36/0022 370/331 |
| 2016/0057686 A1* | 2/2016 | Yang | | H04W 36/0016 370/332 |
| 2016/0127956 A1* | 5/2016 | Jujaray | | H04W 36/0066 455/437 |
| 2016/0219474 A1* | 7/2016 | Singh | | H04W 36/00837 |
| 2016/0234749 A1* | 8/2016 | Singh | | H04W 36/0022 |
| 2016/0262058 A1* | 9/2016 | Jeong | | H04W 4/025 |
| 2016/0295498 A1* | 10/2016 | Persson | | H04W 8/08 |
| 2016/0345210 A1* | 11/2016 | Shan | | H04W 36/0022 |
| 2016/0353512 A1* | 12/2016 | Lu | | H04W 24/10 |
| 2016/0360455 A1* | 12/2016 | Yang | | H04W 36/10 |
| 2017/0026882 A1* | 1/2017 | Centonza | | H04W 24/02 |
| 2017/0150410 A1* | 5/2017 | Yang | | H04W 36/04 |
| 2017/0195924 A1* | 7/2017 | Dwyer | | H04W 36/0066 |
| 2017/0332287 A1* | 11/2017 | Sethi | | H04W 36/0022 |
| 2017/0347263 A1* | 11/2017 | Dutta | | H04W 8/183 |
| 2018/0063755 A1* | 3/2018 | Chong | | H04W 36/0022 |
| 2018/0084401 A1* | 3/2018 | Mbonye | | H04W 8/02 |
| 2018/0084489 A1* | 3/2018 | Su | | H04W 48/16 |
| 2018/0206155 A1* | 7/2018 | Jeong | | H04W 36/0022 |
| 2019/0104451 A1* | 4/2019 | Dash | | H04W 36/0083 |

FOREIGN PATENT DOCUMENTS

| | | | | |
|---|---|---|---|---|
| EP | 2920998 A1 * | 9/2015 | | H04W 36/0022 |
| EP | 2920998 A4 * | 6/2016 | | H04W 36/0022 |
| WO | 2010146465 A1 | 12/2010 | | |
| WO | 2013009230 A1 | 1/2013 | | |
| WO | 2013025714 A1 | 2/2013 | | |
| WO | WO-2014077752 A1 * | 5/2014 | | H04W 36/0022 |
| WO | WO-2016028570 A1 * | 2/2016 | | H04W 36/0022 |

OTHER PUBLICATIONS

3GPP,"Non-Access-Stratum (NAS) protocol for Evolved Packet System (EPS)", Technical Specification, Dec. 2015,TS 24.301 V13. 4.0, France.

Official Communication based on European Patent Application No. 16 168 941.9 (7 Pages) dated May 4, 2017 (Reference Purpose Only).

* cited by examiner

METHODS AND DEVICES FOR CIRCUIT-SWITCHED FALLBACK PROCEDURES

CROSS-REFERENCE TO RELATED APPLICATION

This application claims priority to European Patent Application Serial No. 16 168 941.9, which was filed May 10, 2016, and is incorporated herein by reference in its entirety.

TECHNICAL FIELD

Various embodiments relate generally to methods and devices for circuit-switched fallback procedures.

BACKGROUND

Long Term Evolution (LTE) has emerged as a high speed and capacity radio communication standard that offers radio and core network improvements over predecessor Second and Third Generation (2G and 3G) networks such as Global System for Mobile Communications (GSM) and Universal Mobile Telecommunications System (UMTS). While such predecessor or "legacy" networks may employ a combination of circuit-switched (CS) and packet-switched (PS) networks for data transfer, LTE networks may be entirely packet-switched and accordingly may rely on an Internet Protocol (IP)-based network architecture for data transfer.

Despite the improvements offered by LTE over the various legacy networks, many currently deployed LTE networks may not be able to provide full support for voice calls (known as Voice over LTE (VoLTE)). Accordingly, while users may enjoy the high data rates of LTE for other packet data uses (such as e.g. Internet access, application data, streaming media, etc.), mobile terminals may need to rely on circuit-switched legacy networks to support voice calls. A mobile terminal may thus need to transition, or "fall back", to a legacy circuit-switched network in order to both make and receive voice calls. Such procedures are known as Circuit-Switched Fallback (CSFB).

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
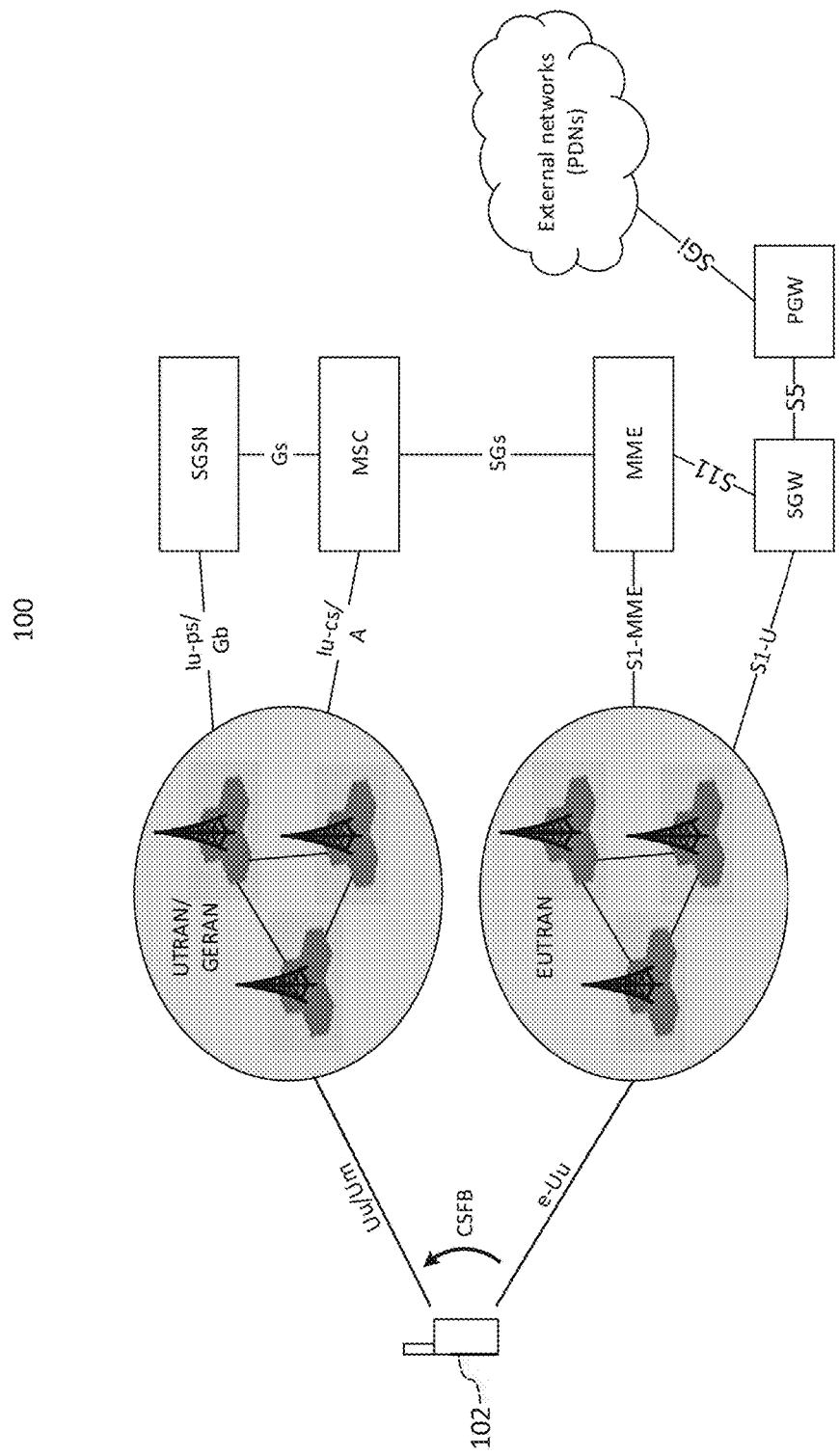
FIG. 1 shows a network diagram for a radio communication network.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

It is appreciated that any vector and/or matrix notation utilized herein is exemplary in nature and is employed solely for purposes of explanation. Accordingly, it is understood that the approaches detailed in this disclosure are not limited to being implemented solely using vectors and/or matrices, and that the associated processes and computations may be equivalently performed with respect to sets, sequences, groups, etc., of data, observations, information, signals, samples, symbols, elements, etc. Furthermore, it is appreciated that references to a "vector" may refer to a vector of any size or orientation, e.g. including a 1×1 vector (e.g. a scalar), a 1×M vector (e.g. a row vector), and an M×1 vector (e.g. a column vector). Similarly, it is appreciated that references to a "matrix" may refer to matrix of any size or orientation, e.g. including a 1×1 matrix (e.g. a scalar), a 1×M matrix (e.g. a row vector), and an M×1 matrix (e.g. a column vector).

A "circuit" as used herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions which will be described below in further detail may also be understood as a "circuit". It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

As used herein, "memory" may be understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component comprising one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "base station" used in reference to an access point of a mobile communication network may be understood as a macro base station, micro base station, Node B, evolved NodeB (eNB), Home eNodeB, Remote Radio Head (RRH), relay point, etc. As used herein, a "cell" in the context of telecommunications may be understood as a sector served by a base station. Accordingly, a cell may be a set of geographically co-located antennas that correspond to a particular sectorization of a base station. A base station may thus serve one or more cells (or sectors), where each cell is characterized by a distinct communication channel. Furthermore, the term "cell" may be utilized to refer to any of a macrocell, microcell, femtocell, picocell, etc.

For purposes of this disclosure, radio communication technologies may be classified as one of a Short Range radio communication technology, Metropolitan Area System radio communication technology, or Cellular Wide Area radio communication technology. Short Range radio communication technologies include Bluetooth, WLAN (e.g. according to any IEEE 802.11 standard), and other similar radio communication technologies. Metropolitan Area System radio communication technologies include Worldwide Interoperability for Microwave Access (WiMax) (e.g. according to an IEEE 802.16 radio communication standard, e.g. WiMax fixed or WiMax mobile) and other similar radio communication technologies. Cellular Wide Area radio communication technologies include GSM, UMTS, LTE, General Packet Radio Service (GPRS), Enhanced Data Rates for GSM Evolution (EDGE), High Speed Packet Access (HSPA), HSPA Plus (HSPA+), and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies. It is understood that exemplary scenarios detailed herein are demonstrative in nature, and accordingly may be similarly applied to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, encompasses both an access section of a network (e.g. a radio access network (RAN) section) and a core section of a network (e.g. a core network section). The term "radio idle mode" or "radio idle state" used herein in reference to a mobile terminal refers to a radio control state in which the mobile terminal is not allocated at least one dedicated communication channel of a mobile communication network. The term "radio connected mode" or "radio connected state" used in reference to a mobile terminal refers to a radio control state in which the mobile terminal is allocated at least one dedicated uplink communication channel of a mobile communication network.

Unless explicitly specified, the term "transmit" encompasses both direct (point-to-point) and indirect transmission (via one or more intermediary points). Similarly, the term "receive" encompasses both direct and indirect reception. The term "communicate" encompasses one or both of transmitting and receiving, i.e. unidirectional or bidirectional communication in one or both of the incoming and outgoing directions.

In contrast to combined circuit-switched (CS) and packet-switched (PS) legacy networks (combined CS-PS networks) such as GSM and UMTS, LTE networks utilize an entirely packet-switched network architecture for both voice and data. While packet-switched data transfer may remain similar between LTE and the combined CS-PS legacy networks, the transition from circuit-switched to packet-switched connections for voice calls may present a dramatic change and require significant overhaul to enable full-voice call support in LTE networks (such as the implementation of an IP Multimedia Services (IMS) framework in the LTE core network). Accordingly, LTE network operators have identified several "interim" solutions that may allow voice support for LTE-enabled mobile terminals, which may operators may employ in the near future before eventually implementing full voice support for LTE (known as VoLTE).

One such proposed interim solution is Circuit-Switched Fallback (CSFB), in which a mobile terminal that is currently connected to an LTE network may transition or 'fall back' to a circuit-switched legacy network such as GSM or UMTS to make or receive voice calls. The mobile terminal may remain on the legacy network for the duration of the voice call before ultimately transitioning back to the LTE network upon termination of the voice call. Such CSFB may accordingly allow network operators to use the legacy infrastructure to support voice calls while also allowing use of the higher-speed LTE network infrastructure for packet data transfer.

As previously noted, mobile terminals may employ CSFB to both make and receive voice calls, i.e. for both mobile originating and mobile terminating voice calls. In a mobile originating call context, a mobile terminal that aims to place an outgoing call may perform fallback from an LTE network to a circuit-switched legacy network (e.g. GSM, UMTS, etc.) and subsequently initiate and carry out the outgoing call on the legacy network. In a mobile terminating call context, a mobile terminal that is attached to an LTE network and additionally registered with a legacy network may be the destination for an incoming call on the legacy network. Accordingly, the legacy network may inform the LTE network of the incoming call to allow the LTE network to subsequently notify the mobile terminal. The mobile terminal may then need to perform fallback to the legacy network in order to accept the call.

FIG. 1 shows a network diagram for radio communication network 100, which mobile terminal 102 may rely on for a variety of communication services including circuit-switched and packet-switched data transfer. As shown in FIG. 1, radio communication network 100 may include a legacy network composed of a GSM/EDGE RAN (GERAN)/Universal Terrestrial RAN (UTRAN), a Service GPRS Support Node (SGSN), and a Mobile Switching Center (MSC), and an LTE network composed of an Evolved UMTS RAN (EUTRAN), a Mobility Management Entity (MME), a Serving Gateway (SGW), and a Packet Data Network (PDN) Gateway (PGW). Radio access network 100 may thus include both radio access components (such as the UTRAN/GERAN and the EUTRAN) and core network components (such as the SGSN, MSC, MME, SGW, and PGW). It is noted that the network diagram for radio communication network 100 depicted in FIG. 1 is focused on CSFB procedures and associated network entities; accordingly, radio communication network 100 may include additional components that are not explicitly shown in FIG. 1. For example, the LTE core network that includes the MME, SGW, and PGW in FIG. 1 may additionally include a Home Subscriber Service (HSS) for storing subscriber information, a Policy Charging Rules Function (PCRF) server responsible for managing service and billing policies for each subscriber, and one or more additional LTE network components. Likewise, the legacy core network may additionally include a Gateway GPRS Support Node (GGSN) to interface between the SGSN and external PDNs, a Visitor Location Register (VLR) responsible for managing user information for the MSC, a Gateway MSC (GMSC) interfacing the MSC with external CS networks such as a Public Switched Telephone Network (PSTN) and/or Integrated Services Digital Network (ISDN), a Home Location Register (HLR) responsible for managing user information for the entire legacy network, and one or more additional GSM and/or UMTS network components. Furthermore, although FIG. 1 depicts the core network components of the LTE and legacy networks as single entities, radio communication network 100 may include more than one SGSN, MSC, MME, SGW, PGW, etc., where each respective component may e.g. serve mobile terminals located in a specific geographic area. The UTRAN/GERAN of radio communication network 100 is depicted collectively in FIG. 1 for practicality, and may be composed of either one or both of a UTRAN and a GERAN. The EUTRAN may be composed of one or more eNodeBs (connected via X2 interfaces) while the GERAN/UTRAN may be composed of one or more Base Transceiver Stations (BTSs), Base Station Controllers (BSCs), NodeBs, and/or Radio Network Controllers (RNCs). Mobile terminal 102 may rely on such radio access nodes of radio communication network 100 as a radio interface to exchange data with internal and external components of the core network of radio communication network 100.

As previously indicated, the LTE network may provide a variety of packet data services to mobile terminal 102, such as by enabling mobile terminal 102 to access one or more external PDNs via the LTE network. Accordingly, mobile terminal 102 may be able to provide a user of mobile terminal 102 with a variety of data services that are available via the LTE network including basic Internet access, multimedia services (audio, video, image, text, etc.), mobile application connectivity, etc.

The MME (which as previously noted may be one of a plurality of MMEs of the LTE network) may act as a control node for the LTE network, and accordingly may oversee the establishment and maintenance of such PDN connections in addition to managing the mobility of mobile terminal 102. Accordingly, mobile terminal 102 may 'attach' to the LTE network by first registering with the MME via an attach procedure. As shown in FIG. 1, mobile terminal 102 may rely on the radio interface provided by the EUTRAN in order to support a wireless connection to the MME via the EUTRAN, i.e. may utilize the wireless interface provided by the radio access section of the LTE network in order to connect to the MME located in the core network. Mobile terminal 102, the EUTRAN, and the core network components may rely on established communication protocols in order to exchange information along the various interfaces that connect each of the network components.

In order to transmit and receive user data with the external PDNs, mobile terminal 102 may need to exchange control information with both the EUTRAN and the MME, thus allowing the EUTRAN to govern data transfer over the radio interface and the MME to manage the data connection from mobile terminal 102 to the external PDNs of interest via the SGW and PGW. The radio interface between mobile terminal 102 and the EUTRAN, i.e. between mobile terminal 102 and a given serving eNodeB of the EUTRAN, may thus be governed by Access Stratum (AS) protocols, i.e. communication protocols that govern the radio access section of the LTE network which may include Radio Resource Control (RRC), Packet Data Convergence Protocol (PDCP), Radio Link Control (RLC), and Media Access Control (MAC). The interface between mobile terminal 102 and the MME may be governed by Non-Access Stratum (NAS) protocols, which may include an Evolved Packet System (EPS) Mobility Management (EMM) protocol and EPS Session Management (ESM) protocol. As will be further detailed below, a controller of mobile terminal 102 may direct the radio functionality of mobile terminal 102 in accordance with the AS and NAS protocols of the LTE network in addition to the AS and NAS protocols of the legacy network.

As previously indicated, mobile terminal 102 may need to register with the MME via an initial attach procedure to the network. Upon registration with the MME, mobile terminal 102 may transition from an EMM-DEREGISTERED (i.e. not registered with the MME) to an EMM-REGISTERED state (i.e. registered with the MME). The MME may then establish a default PDN connection to a PDN (e.g. a default PDN providing Internet access) for mobile terminal 102 via the SGW and PGW (both of which the MME may select). The MME may then continuously oversee the maintenance of the PDN connections of mobile terminal 102 via the SGW and PGW as part of the ESM NAS protocols and monitor the mobility of mobile terminal 102 as part of the EMM NAS protocols.

Mobile terminal 102 may either have an active or idle connection over the radio access and core network, which may depend on the current level of network activity of mobile terminal 102. For example, mobile terminal 102 may be in a connected state in which mobile terminal 102 is allocated dedicated LTE radio resources (over the e-Uu interface between mobile terminal 102 and one or more eNodeBs of the EUTRAN), i.e. an RRC-CONNECTED state, and dedicated LTE core network resources (over the S1-MME interface), i.e. an EMM-CONNECTED state, and accordingly may have an active NAS signaling connection with the MME that is realized over the e-Uu and the S1-MME. Mobile terminal 102 may enter into such a connected state (RRC-CONNECTED and EMM-CONNECTED) in order to actively exchange user data, such as to provide Internet access or other packet data to a user of mobile terminal 102.

Conversely, if mobile terminal 102 does not have an active data connection, mobile terminal 102 may be in an idle state (RRC-IDLE and EMM-IDLE). In such an idle state, mobile terminal 102 may not be allocated any dedicated radio or core network resources. While mobile terminal 102 may remain registered with the MME and maintain at least one PDN connection (e.g. a default PDN connection allowing for always-on connectivity, albeit in an inactive state without any active data transfer), mobile terminal 102 may only receive periodic paging messages from the EUTRAN which may alert mobile terminal 102 of any incoming data activity intended for mobile terminal 102. Such paging may be triggered by the MME, which may request one or more eNodeBs of the EUTRAN to broadcast paging messages intended for mobile terminal 102. In order to select eNodeBs proximate to mobile terminal 102 for paging, MME may track the location of mobile terminal 102. Specifically, mobile terminal 102 may be expected to transmit location updates in the form of Tracking Area Updates (TAUs) to the MME, which may specify the Tracking Area (TA) in which mobile terminal 102 is currently located. The MME may thus track the location of mobile terminal 102 on a per-TA basis while mobile terminal 102 is in idle mode, and accordingly may signal the eNodeBs associated with the last TA reported by mobile terminal 102 to provide paging services intended for mobile terminal 102.

Returning to a CSFB context, mobile terminal 102 may register with the MME during an attach procedure to the LTE network, which may enable mobile terminal 102 to subsequently enter into a connected state (EMM-CONNECTED and RRC-CONNECTED) and actively exchange data on the LTE network. However, as previously indicated the LTE network may not be able to support voice calls (e.g. VoLTE is not supported or not currently available), which may constrain mobile terminal 102 to rely on the legacy network for voice calls. Mobile terminal 102 may thus additionally need to register with the MSC of the legacy network, which may be responsible for routing voice calls within the legacy network and may thus need to be aware of current location information for mobile terminal 102 in order to properly route voice calls to mobile terminal 102.

Mobile terminal 102 may therefore register with both the MME and the MSC in parallel via a combined attach procedure (e.g. an EPS/International Mobile Subscriber Identity (IMSI) attach), thus allowing mobile terminal 102 to register with both the LTE and legacy networks. In such a combined attach procedure, mobile terminal 102 may first register with the MME, which may then proceed to register mobile terminal 102 with the MSC via the SGs interface. The MME may provide the MSC with location information for mobile terminal 102, such as by converting the TA for the LTE network reported by mobile terminal 102 (during initial attach or in a subsequent TAU) to a Location Area (LA) for the legacy network. The MME may continuously report the location of mobile terminal 102 to the MSC, such as e.g. by determining the corresponding LA for the TA reported in each TAU and reporting such to the MSC. The MSC may thus be able to track the location of mobile terminal 102 via initial attach and subsequent updates provided by the MME in anticipation of subsequent CS call routing.

Mobile terminal 102 may either be the destination or origin of a CSFB call, i.e. a mobile terminating or mobile originating call, respectively. In a mobile terminating call context, the MSC may receive notification that an incoming CS call is intended for mobile terminal 102 and may notify the MME of the incoming call over the SGs interface. The MME may then either directly report the incoming call to mobile terminal 102 via a NAS signaling message if mobile terminal 102 is in connected mode or may request the EUTRAN to page mobile terminal 102 over the AS if mobile terminal 102 is in idle mode. Upon receipt of the notification (either in the form of AS paging or NAS signaling), mobile terminal 102 may then transmit an Extended Service Request to the MME (after establishing an RRC and EMM connection if initially in idle mode) to accept or decline the incoming call. In a mobile originating call context, a user of mobile terminal 102 may trigger an outgoing call, after which mobile terminal 102 may transmit an Extended Service Request to the MME (after establishing an RRC and EMM connection if initially in idle mode).

Mobile terminal 102 may thus transmit an Extended Service Request to the MME for both mobile originating and mobile terminating CSFB calls. Receipt of an Extended Service Request accepting the incoming call may signal to the MME that mobile terminal 102 aims to perform CSFB to engage in a voice call. Accordingly, upon receipt of an Extended Service Request the MME may initiate CSFB procedures for mobile terminal 102 and may provide assistance to support mobile terminal 102 in transferring to the legacy network. Specifically, the MME may either oversee a handover of mobile terminal 102 to a specific legacy cell (e.g. if mobile terminal 102 has an active PS connection and prefers PS handover) or may trigger a redirect to the legacy network by providing mobile terminal 102 with a target legacy carrier frequency. Mobile terminal 102 may then switch from the LTE network to the legacy network under the handover or redirect guidance of the MME and subsequently initiate and carry out the desired voice call. Such guidance by the MME may enable mobile terminal 102 to seamlessly transition from the LTE network to the legacy network to carry out the desired voice call.

However, in certain scenarios the Extended Service Request procedure may fail, thus preventing the MME from providing assistance to mobile terminal 102. Such an Extended Service Request procedure failure may occur for a variety of reasons, such as access barred, lower layer failure, failure of the MME to receive the Extended Service Request, etc. Regardless of the particular underlying cause, in such failure scenarios mobile terminal 102 may need to execute the transition to the legacy network without assistance from the MME. Accordingly, instead of being guided by the MME to the legacy network through a handover or redirect procedure, mobile terminal 102 may need to autonomously switch to the legacy network. Mobile terminal 102 may therefore need to identify and connect to a suitable legacy cell to engage in the desired voice call.

As the MME is not available to direct the switch to the legacy network, the autonomous switch by mobile terminal 102 may be unnecessarily complicated and time consuming. For example, mobile terminal 102 may need to perform a fresh cell scan in order to identify suitable legacy cells (potentially on multiple networks, e.g. both on the GERAN and UTRAN), which may require a considerable duration of time. Mobile terminal 102 may then need to select a cell from the detected legacy cells, such as e.g. the strongest cell, and connect to the selected cell to subsequently carry out the voice call. As previously indicated, the MME may track the mobility of mobile terminal 102 (by receiving TAUs from mobile terminal 102) and report the location of mobile terminal 102 on a per-LA basis to the MSC. Accordingly, if the selected cell is located in a different LA Identity (LAI) than the LAI corresponding to the TA identity (TAI) reported to the MME in the most recent TAU, mobile terminal 102 may additionally need to perform a Location Area Update (LAU) in order to notify the MSC of the new LAI. Such may be further complicated if the MSC of the selected cell is different than the MSC at which mobile terminal 102 was previously registered, in which case mobile terminal 102 may need to perform an MSC switch procedure in order to ultimately carry out the voice call.

As a result, the CSFB procedure may be particularly complex if the Extended Service Request procedure fails. As noted above, the absence of assistance by the MME may require mobile terminal 102 to autonomously perform legacy cell measurement and selection in addition to potential LAU and MSC switching procedures to set up the voice call. Such autonomous CSFB operations by mobile terminal 102 may be excessively time consuming and have a high power penalty due to the involved radio activity.

As will be detailed, mobile terminal 102 may be able to avoid the complications of failed Extended Service Request procedures by developing a database of legacy cells in advance preparation for such potential failure and applying the legacy cell database to select a suitable legacy cell in the event of failure. Specifically, mobile terminal 102 may perform cell measurement on legacy carriers during normal operation in order to detect available legacy cells. Mobile terminal 102 may then organize the detected legacy cells based on a suitability criteria, such as e.g. received signal strength or quality, network identity, registered LA, etc. In the event of Extended Service Request failure, mobile terminal 102 may be able to reference the legacy cell database to promptly select an appropriate legacy cell and subsequently establish a connection with the selected legacy cell to carry out the voice call. Such may allow mobile terminal 102 to avoid the complications of recovery from Extended Service Request failures. Furthermore, mobile terminal 102 may be able to employ such a legacy cell database instead of attempting Extended Service Request; for example, as opposed to transmitting an Extended Service Request for a given voice call mobile terminal 102 may instead simply transition to the legacy network using a legacy cell selected from the legacy cell database and subsequently carry out the voice call on the selected legacy cell. In normal procedures, mobile terminal 102 may need to wait for the MME to respond with a handover or redirect command after transmitting an Extended Service Request to the MME. Although mobile terminal 102 may consequently not receive guidance from the MME to assist in the transition, mobile terminal 102 may be able to avoid waiting for a handover or redirect command and instead proceed straight to reselecting to the legacy network. Mobile terminal 102 may therefore be able to expedite the reselection process, albeit may not have the benefit of assistance by the MME.

Figure 2:
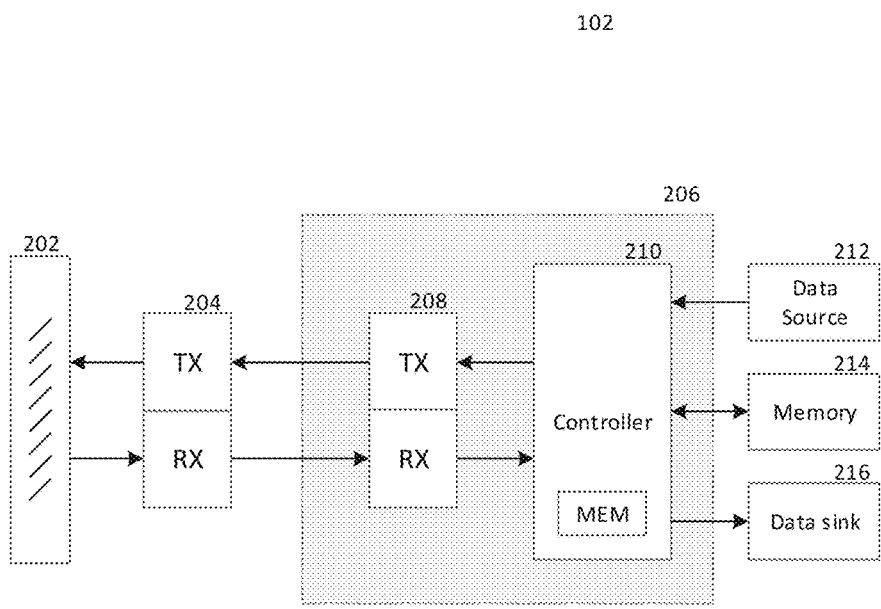
FIG. 2 shows a system diagram for a radio communication device.

FIG. 2 shows an internal configuration of mobile terminal 102, which may include antenna system 202, radio frequency (RF) transceiver 204, baseband modem 206 (including physical layer processing circuit 208 and controller 210), data source 212, memory 214, and data sink 216. As will be detailed, mobile terminal 102 may be configured to generate a legacy cell database based on radio measurements and, in the event of Extended Service Request failure for a given voice call, may subsequently apply the legacy cell database to select a legacy cell to reselect to in order to carry out the voice call. Mobile terminal 102 may alternatively skip the Extended Service Request procedure with the MME and instead autonomously perform reselection to the legacy network with a selected cell from the legacy cell database. Although not explicitly shown in FIG. 2, mobile terminal 102 may include one or more additional hardware, software, and/or firmware components (such as processors/microprocessors, controllers/microcontrollers, other specialty or generic hardware/processors/circuits, etc.), peripheral device(s), memory, power supply, external device interface(s), subscriber identify module(s) (SIMs), user input/output devices (display(s), keypad(s), touchscreen(s), speaker(s), external button(s), camera(s), microphone(s), etc.), etc.

In an abridged operational overview, mobile terminal 102 may transmit and receive radio signals on one or more radio access networks. Baseband modem 206 may direct such communication functionality of mobile terminal 102 according to the communication protocols associated with each radio access network, and may execute control over antenna system 202 and RF transceiver 204 in order to transmit and receive radio signals according to the formatting and scheduling parameters defined by each communication protocol. As will be detailed, mobile terminal 102 may be characterized as a radio communication device including a measurement circuit (e.g. physical layer processing circuit 208) configured to perform radio measurement to identify one or more cells of a legacy network in anticipation of circuit-switched orders, and a control circuit (e.g. controller 210) configured to identify a pending circuit-switched order supported by the legacy network while attached to a current network, and switch from the current network to the legacy network to engage in the pending circuit-switched using a selected cell of the one or more cells.

Mobile terminal 102 may transmit and receive radio signals with antenna system 102, which may be a single antenna or an antenna array composed of multiple antennas and may additionally include analog antenna combination and/or beamforming circuitry. In the receive path (RX), RF transceiver 204 may receive analog radio frequency signals from antenna system 202 and perform analog and digital RF front-end processing on the analog radio frequency signals to produce digital baseband samples (e.g. In-Phase/Quadrature (IQ) samples) to provide to baseband modem 204. RF transceiver 204 may accordingly include analog and digital reception circuitry including amplifiers (e.g. a Low Noise Amplifier (LNA), filters, RF demodulators (e.g. an RF IQ demodulator)), and analog-to-digital converters (ADCs) to convert the received radio frequency signals to digital baseband samples. In the transmit path (TX), RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission circuitry including amplifiers (e.g. a Power Amplifier (PA), filters, RF modulators (e.g. an RF IQ modulator), and digital-to-analog converters (DACs) to mix the digital baseband samples received from baseband modem 206 to produce the analog radio frequency signals for wireless transmission by antenna system 202.

As shown in FIG. 2, baseband modem 206 may include physical layer processing circuit 208, which may perform physical layer (Layer 1) transmission and reception processing to prepare outgoing transmit data provided by controller 210 for transmission via RF transceiver 204 and prepare incoming received data provided by RF transceiver 204 for processing by controller 210. Physical layer processing circuit 210 may accordingly perform one or more of error detection, forward error correction encoding/decoding, channel coding and interleaving, physical channel modulation/demodulation, physical channel mapping, radio measurement and search, frequency and time synchronization, antenna diversity processing, power control and weighting, rate matching, retransmission processing, etc. Physical layer processing circuit 208 may be structurally realized as hardware logic, e.g. as an integrated circuit or FPGA, as software logic, e.g. as program code defining arithmetic, control, and I/O instructions stored in a non-transitory computer-readable storage medium and executed on a processor, or as a combination of hardware and software logic. Although not explicitly shown in FIG. 2, physical layer processing circuit 208 may include a control circuit such as a processor configured to control the various hardware and software processing components of physical layer processing circuit 208 in accordance with physical layer control logic defined by the communications protocol for the relevant radio access technologies. Furthermore, while physical layer processing circuit 208 is depicted as a single component in FIG. 2, physical layer processing circuit 208 may be collectively composed separate sections of physical layer processing circuitry where each respective section is dedicated to the physical layer processing of a particular radio access technology.

Mobile terminal 102 may be configured to operate according to one or more radio access technologies, which may be directed by controller 210. Controller 210 may thus be responsible for controlling the radio communication components of mobile terminal 102 (antenna system 202, RF transceiver 204, and physical layer processing circuit 208) in accordance with the communication protocols of each supported radio access technology, and accordingly may represent the Access Stratum and Non-Access Stratum (NAS) (also encompassing Layer 2 and Layer 3) of each supported radio access technology. Controller 210 may be structurally embodied as a protocol processor configured to execute protocol software (retrieved from controller memory MEM as shown in FIG. 2) and subsequently control the radio communication components of mobile terminal 102 in order to transmit and receive communication signals in accordance with the corresponding protocol control logic defined in the protocol software.

Controller 210 may therefore be configured to manage the radio communication functionality of mobile terminal 102 in order to communicate with the various radio and core network components of radio communication network 100, and accordingly may be configured according to the communication protocols for both the LTE network and the GSM/UMTS legacy network. Controller 210 may either be a unified controller that is collectively responsible for all supported radio access technologies (e.g. LTE and GSM/UMTS) or may be composed of multiple separate controllers where each controller is a dedicated controller for a particular radio access technology, such as e.g. a dedicated LTE controller and a dedicated legacy controller (or alternatively a dedicated LTE controller, dedicated GSM controller, and a dedicated UMTS controller). Regardless, controller 210 may be responsible for directing radio communication activity of mobile terminal 102 according to the communication protocols of the LTE and legacy networks. As also previously noted regarding physical layer processing circuit 208, one or both of antenna system 202 and RF transceiver 204 may similarly be partitioned into multiple dedicated components that each respectively correspond to one or more of the supported radio access technologies. Depending on the specifics of each such configuration and the number of supported radio access technologies, controller 210 may be configured to control the radio communication operations of mobile terminal 102 in accordance with a master/slave RAT hierarchical or multi-SIM scheme.

Mobile terminal 102 may further comprise data source 212, memory 214, and data sink 216, where data source 212 may include sources of communication data above controller 210 (i.e. above the NAS/Layer 3) and data sink 212 may include destinations of communication data above controller 210 (i.e. above the NAS/Layer 3). Such may include, for example, an application processor of mobile terminal 102, which may be configured to execute various applications and/or programs of mobile terminal 102 at an application layer of mobile terminal 102, such as e.g. an Operating System (OS), a User Interface (UI) for supporting user interaction with mobile terminal 102, and/or various user applications. The application processor may interface with baseband modem 206 (as data source 212/data sink 216) as an application layer to transmit and receive user data such as voice data, audio/video/image data, messaging data, application data, basic Internet/web access data, etc., over a the radio network connection(s) provided by baseband modem 206. Data source 212 and data sink 216 may additionally represent various user input/output devices of communication device 102, such as display(s), keypad(s), touchscreen(s), speaker(s), external button(s), camera(s), microphone(s), etc., which may allow a user of mobile terminal 102 to control various communication functions of mobile terminal 102 associated with user data.

Memory 214 may embody a memory component of mobile terminal 102, such as e.g. a hard drive or another such permanent memory device. Although not explicitly depicted in FIG. 2, the various other components of mobile terminal 102 shown in FIG. 2 may additionally each include integrated permanent and non-permanent memory components, such as for storing software program code, buffering data, etc.

As previously indicated, mobile terminal 102 may be configured to generate a legacy cell database for use in case of Extended Service Request failure, and may apply the legacy cell database to select an appropriate legacy cell to connect to in order to carry out a desired voice call (either mobile originating or mobile terminating). Furthermore, mobile terminal 102 may additionally be able to utilize the legacy cell database to avoid Extended Service Request procedures altogether, as mobile terminal 102 may instead be configured to autonomously reselect to an appropriate legacy cell selected from the legacy cell database without initiating Extended Service Request procedures with the MME. As controller 210 may be responsible for the radio communication functionality of mobile terminal 102, controller 102 may direct the interaction of mobile terminal 102 with both the LTE and legacy networks in generating the legacy cell database and performing the transition to the legacy network to engage in the desired voice call.

Figure 3:
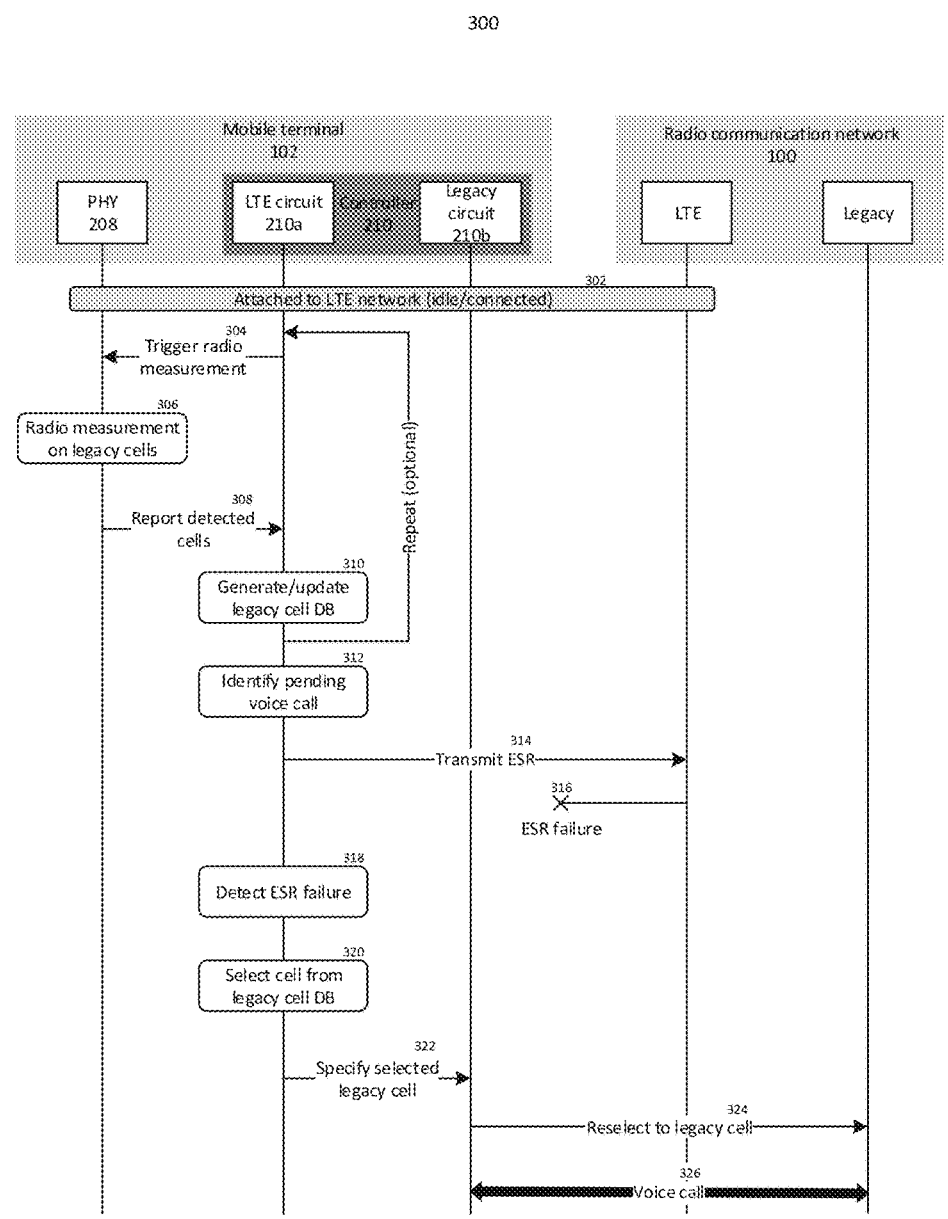
FIG. 3 shows a message sequence chart for a CSFB procedure.

FIG. 3 depicts message sequence chart 300 illustrating the signaling between components of mobile terminal 102 and radio communication network 100 related to the Extended Service Request failure procedure introduced above. As shown in FIG. 3, controller 210 may be composed of LTE circuit 210a and legacy circuit 210b, which may be control circuits for LTE network operation and legacy network operation, respectively. LTE circuit 210a may thus collectively embody the AS and NAS protocols of the LTE network while legacy circuit 210b may embody the AS and NAS protocols of the legacy network. LTE circuit 210a and legacy circuit 210b may be realized as separate processors each configured to execute the respective protocol stack instructions or collectively as a single unified processor configured to execute both protocol stacks.

Mobile terminal 102 may initially be attached to the LTE network in either an idle or connected state at 302, and may be registered at both the LTE network (at the MME) and the legacy network (at the MSC) via an earlier combined attach procedure. LTE circuit 210a of controller 210 may then trigger inter-RAT radio measurement for the legacy network at physical layer processing circuit 208 (which may additionally be routed through legacy circuit 210b of controller

210) at 304. LTE circuit 210*a* may trigger radio measurement at 304 according to the occurrence of specific events. For example, LTE circuit 210*a* may trigger radio measurement at 304 each time that LTE circuit 210*a* switches to a new serving cell (either in connected mode or idle mode). Additionally or alternatively, LTE circuit 210*a* may initiate a timer after each radio measurement triggering at 304 and, if LTE circuit 210*a* remains attached to the same serving cell at expiry of the timer, may trigger radio measurement again at 304 in order to "update" the detected legacy cells for the currently attached cell at the legacy cell database.

Physical layer processing circuit 208 may then perform radio measurement on the legacy network at 306 in order to detect legacy cells on the legacy network. Depending on the current connectivity status of mobile terminal 102, physical layer processing circuit 208 may either have to perform the radio measurements according to an idle or connected mode measurement configuration. Accordingly, if mobile terminal 102 is in idle mode, physical layer processing circuit 208 may perform the legacy radio measurements (which may thus be inter-RAT measurements) according to a paging or discontinuous reception (DRX) cycle. Conversely, if mobile terminal 102 is in connected mode, physical layer processing circuit 208 may perform the legacy radio measurements during measurement gaps allocated during the connected mode schedule. Although physical layer processing circuit 208 may have greater flexibility to perform the legacy cell measurements if mobile terminal 102 is in idle mode (as no active transmission/reception other than paging is occurring), physical layer processing circuit 208 may be able to perform the legacy radio measurements either in idle or connected mode. Furthermore, physical layer processing circuit 208 may re-use radio measurements triggered for other purposes for generating the legacy cell database. For example, physical layer processing circuit 208 may utilize legacy radio measurements that were initiated as part of handover, cell reselection, measurement reporting, other mobility procedures, etc., to generate the legacy cell database. Physical layer processing circuit 208 may thus obtain the legacy radio measurements explicitly for generating the legacy cell database and/or as part of other mobility procedures that are not directly related to the legacy cell database.

Physical layer processing circuit 208 may perform the legacy radio measurements on one or more target legacy carrier channels, such as e.g. one or more GSM carrier channels and/or one or more UMTS carrier channels which may each be identified by an Absolute Radio Frequency Channel Number (ARFCN) in the case of GSM and a UMTS ARFCN (UARFCN) in the case of UMTS. LTE circuit 210*a* may specify the target legacy carrier channels as part of the radio measurement triggering in 304 or physical layer processing circuit 208 may independently select the target legacy carrier channels. Physical layer processing circuit 208 may perform the radio measurements by processing signals received on each of the target legacy carrier channels and identifying any legacy cells that are detectable in the received signals. Physical layer processing circuit 306 may obtain identity information in addition to other cell parameters for each detected legacy cell by detecting reference signals received from each detected legacy cell in addition to decoding system information (System Information (SI) messages for GSM cells and System Information Block (SIB) messages for UMTS cells) received from each detected legacy cell. Physical layer processing circuit 306 may aggregate such cell identity information and cell parameters for the legacy cells detected during 306 and report the detected cells back to LTE circuit 210*a* in 308.

LTE circuit 210*a* may receive the cell information for the detected legacy cells from physical layer processing circuit 208 at 308 and apply the cell information to generate a legacy cell database at 308. As previously indicated, controller 210 may utilize the legacy cell database to select an appropriate legacy cell for reselection in case of Extended Service Request failure; accordingly, LTE circuit 210*a* may arrange the legacy cell database in order to rank the detected legacy cells according to a suitability criteria.

Figure 4:
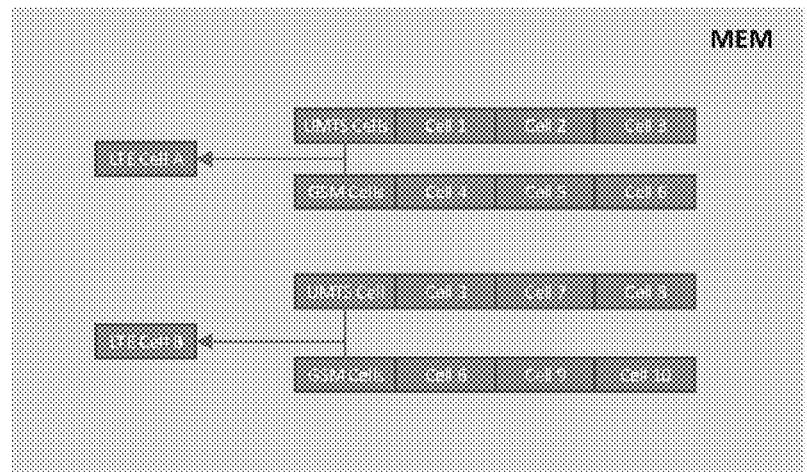
FIG. 4 shows a graphical depiction of an exemplary cell mapping.

LTE circuit 210*a* may generate and maintain the legacy cell database in a memory component such as MEM of controller 210. Although various database organization techniques are also within the scope of this disclosure, LTE circuit 210*a* may organize the legacy cell database as a 'cell map' depending on the LTE that mobile terminal 102 is connected to at the time of the legacy radio measurements. FIG. 4 shows a graphical depiction of an exemplary cell mapping that LTE circuit 210*a* may generate based on legacy cells reported by physical layer processing circuit 208. In the exemplary context of FIG. 4, physical layer processing circuit 208 may perform legacy radio measurements in 306 and report UMTS cells 1, 2, and 3 and GSM cells 4, 5, and 6 to LTE circuit 210*a* as the detected legacy cells in 308. LTE circuit 210*a* may then identify the currently attached LTE cell (either camped in idle mode or actively connected in connected mode), which may be e.g. LTE cell A. LTE circuit 210*a* may then generate the legacy cell database by mapping the reported legacy cells (UMTS cells 1-3 and GSM cells 4-6) to the currently attached LTE cell, e.g. LTE cell A, as shown in FIG. 4.

As shown in FIG. 3, LTE circuit 210*a* and physical layer processing circuit 208 may repeat the legacy radio measurement and database generation in 304-310, thus allowing LTE circuit 210*a* to continuously update the legacy cell database. Returning to the exemplary scenario of FIG. 4, physical layer processing circuit 208 may report the detected legacy cells at 308 as UMTS cells 3, 7, and 8 and GSM cells 6, 9, and 10. As shown in FIG. 4, LTE circuit 210*a* may update the legacy cell database by creating a new mapping for the currently attached LTE cell, e.g. LTE cell B. LTE circuit 210*a* may therefore create an entry of the detected legacy cells reported by physical layer processing circuit 208 for each concerned LTE cell to which mobile terminal 102 is attached. LTE circuit 210*a* may thus continue to create new cell mappings (e.g. if the legacy cell database does not have an entry for the currently attached LTE cell) and update existing cell mappings (e.g. if the legacy cell database has an entry for the currently attached LTE cell) upon receipt of each list of detected legacy cells reported by physical layer processing circuit 208.

Controller 210 may thus generate a legacy cell database, which LTE circuit 210*a* may continuously update over time. As previously indicated, controller 210 may employ the legacy cell database in the event of Extended Service Request failure in order to select a suitable legacy cell to connect to in order to carry out a voice call. As shown in FIG. 3, LTE circuit 210*a* may identify a pending voice call in 312. The pending voice call may either be a mobile originating or a mobile terminating voice call. Accordingly, in a mobile originating call context, a user of mobile terminal 102 may trigger an outgoing voice call, e.g. with a user input device of data source 212 at the application layer of mobile terminal 102. Controller 210 may be notified of the pending voice call via data source 212, and may proceed to initiate the pending voice call. As voice calls may not be fully supported by the LTE network, controller 210 may need to rely on the legacy network to carry out the voice call;

consequently, controller 210 may initiate CSFB procedures in order to transition from the LTE network to the legacy network in order to carry out the voice call on the legacy network. LTE circuit 210a may then transmit an Extended Service Request to the LTE network (to the MME via NAS signaling) in 314 (after establishing an RRC and NAS connection if initially in an idle state), which may signal to the MME that mobile terminal 102 intends to perform CSFB to engage in a voice call.

In a mobile terminating call context, mobile terminal 102 may be the destination of an incoming call on the legacy network, which may originate internally to the legacy network (e.g. another user of the legacy network) or externally to the legacy network (e.g. a user of another cellular network or the PSTN). As mobile terminal 102 has previously registered with the MSC via the MME as part of a combined attach procedure, the MSC may identify the MME as the proper routing point for notifying mobile terminal 102 of the incoming call. Accordingly, the MSC may transmit a paging request to the MME that requests for the MME to notify mobile terminal 102 of the incoming call. If mobile terminal 102 is in a connected state, the MME may directly transmit NAS signaling to mobile terminal 102 via the active NAS signaling connection (e.g. a CS Service Notification message); conversely, if mobile terminal 102 is in an idle state, the MME may need to request paging from the EUTRAN at the RRC layer of one or more eNodeBs (corresponding to the TAI reported by mobile terminal 102 in the most recent TAU) in order to page mobile terminal 102. Mobile terminal 102 may then transmit an Extended Service Request to the MME in 314 (after establishing an RRC and NAS connection if initially in an idle state).

However, the Extended Service Request procedure may fail in 316, such as e.g. due to barred access, lower layer failure, failure of the MME to receive the Extended Service Request, etc. Although FIG. 3 depicts the ESR failure in 316 as after transmission by the LTE network, the ESR may failure at any of a variety of stages and accordingly is not limited to any particular failure scenario. As the ESR procedure fails in 316, mobile terminal 102 may need to perform the transition to the legacy network without assistance from the MME. Accordingly, LTE circuit 210a may detect the ESR failure in 318, which may include either an explicit notification of the ESR failure, transmission timer expiry (e.g. expiry of a timer initiated at ESR transmission at 314), etc.

Upon detection of ESR failure at 318, controller 210 may resolve to perform autonomous reselection to the legacy network in order to engage in the pending voice call. In conventional procedures, controller 210 may need to perform a fresh set of inter-RAT measurements on the legacy network in order to select an appropriate legacy cell; however, as previously detailed such may be a complex and time-consuming process and may prolong the required time until the pending voice call can be engaged. Furthermore, in the case of a mobile terminating call, controller 210 may have a limited duration of time available to select an appropriate legacy cell and accordingly.

In order to avoid the complications of fresh legacy cell radio measurement, LTE circuit 210a may employ the legacy cell database in order to promptly select an appropriate legacy cell for reselection and subsequent execution of the pending voice call on the legacy network. Accordingly, LTE circuit 210a may select an appropriate cell from the legacy cell database in 320, which LTE circuit 210a may already have available and consequently may not need to perform fresh radio measurement to obtain. LTE circuit 210a may then specify the selected cell to legacy circuit 210b in 322 as an instruction for legacy circuit 210b to connect to the selected cell.

Legacy circuit 210b may then perform reselection to the legacy cell in 324 according to inter-RAT cell reselection procedures and may thus establish a connection with the legacy network. Legacy circuit 210b may then carry out the pending voice call on the legacy network at 326, such as either by responding to a paging request for the voice call on the legacy network (e.g. for mobile terminating calls) or by initiating an outgoing voice call on the legacy network (e.g. for mobile originating calls). As will further detailed below, legacy circuit 210b may additionally need to perform a location and/or MSC update procedure with the legacy network depending on selected legacy cell. Alternative to selecting a single cell from the legacy cell database in 320, LTE circuit 210a may apply the suitability criteria ranking logic in 320 to identify a set of highest ranked legacy cells to provide to legacy circuit 210b in 322. Legacy circuit 210b may then first attempt to connect to the highest ranked legacy cell and, if the connection attempt to the highest ranked legacy cell is unsuccessful, may continue to iterate down the set of highest ranked legacy cells to attempt to connect to the other highest ranked legacy cells until legacy circuit 210b is able to establish a connection with a legacy cell. If legacy circuit 210b is not successful in connecting with any of the set of highest ranked legacy cells, LTE circuit 210a may provide a set of the next-highest ranked legacy cells for legacy circuit 210b to connect to.

As controller 210 has the legacy cell database prepared prior to ESR failure in 316, mobile terminal 102 may avoid the complications involved in performing fresh inter-RAT cell measurement and reselection that would normally be required for ESR failure. Mobile terminal 102 may thus be able to perform a prompt transition to the legacy network in order to carry out the pending voice call.

As previously indicated, LTE circuit 210a may organize the legacy cell database according to suitability criteria in order to allow LTE circuit 210a to effectively select the legacy cell for reselection in 320. Specifically, physical layer processing circuit 208 may provide LTE circuit 210a with cell information such as measured signal strength/quality, associated network (e.g. Public Land Mobile Network (PLMN)), and Location Area (LA). LTE circuit 210a may then apply predetermined suitability criteria to rank the detected legacy cells based on the cell information provided for the detected legacy cells and may select the selected legacy cell in 320 based on the ranking.

For example, the legacy reselection procedure may be more effective if LTE circuit 210a selects a legacy cell with a strong received signal and/or high signal quality, as such may increase the likelihood that legacy circuit 210b is able to connect to the selected legacy cell and improve the quality of a subsequent voice call on the selected legacy cell. Physical layer processing circuit 208 may thus measure the received signal strength and/or received signal quality of each detected legacy cell in 306 and report such information to LTE circuit 210a in 208. LTE circuit 210a may then rank legacy cells with high signal strength and/or signal quality highly in the legacy cell database when selecting the legacy cell in 320.

Additionally, LTE circuit 210a may rank the detected legacy cells based on the associated PLMN of each detected legacy cell. For example, mobile terminal 102 may have a Home PLMN (HPLMN) that is the preferred PLMN choice of mobile terminal 102. Mobile terminal 102 may additionally have one or more Equivalent HPLMNs (EHPLMNs)

that are also preferred by mobile terminal 102. If no HPLMNs or EHPLMNs are available, mobile terminal 102 may need to connect to another PLMN, i.e. a visited PLMN (VPLMN). The currently attached PLMN at any given time may be referred to as a Registered PLMN (RPLMN), which may additionally have one or more Equivalent PLMNs (EPLMNs) (which may be specified by network broadcast information). Physical layer processing circuit 208 may determine such PLMN information for each detected legacy cell (such as by reading system information) and provide the PLMN information to LTE circuit 210a in 310. LTE circuit 210a may additionally rank the legacy cells of the legacy cell database based on the PLMN information for the detected legacy cells in addition to the PLMN information of the currently attached LTE cell, i.e. the current RPLMN. For example, LTE circuit 210a may rank legacy cells that share the same PLMN as the RPLMN of the current LTE cell or are an EPLMN for the RPLMN higher than legacy cells that belong to different PLMNs. LTE circuit 210a may also rank legacy cells that belong to a home PLMN (HPLMN and EHPLMNs) higher than legacy cells that belong to other PLMNs, in particular any legacy cells that belong to a forbidden PLMN (which may be ranked lowest). Accordingly, LTE circuit 210a may rank legacy cells that belong to a registered PLMN (RPLMN or EPLMNs) or home PLMN (HPLMN or EHPLMNs) highly while ranking legacy cells that belong to other, unknown, or forbidden PLMNs lowly.

LTE circuit 210a may additionally consider the Location Area (LA) of each detected legacy cell in ranking the legacy cells for selection in 320, which may play a significant role in reducing the time required to complete the reselection to the legacy network. As previously indicated, mobile terminal 102 may register with both the LTE and legacy network by performing a combined attach with the MME, which may subsequently provide location information of mobile terminal 102 to the corresponding MSC. Specifically, the MME may identify the current TA in which mobile terminal 102 is located and convert the TA to the counterpart LA of the legacy network. The MME may then provide the resulting LAI to the MSC (thus allowing the MSC to track the location of mobile terminal 102) in addition to providing the LAI to mobile terminal 102 in an attach confirmation message (Attach Accept). Mobile terminal 102 may additionally need to perform a TAU with the MME each time that mobile terminal 102 moves to a new TA (or e.g. a TA not listed in the current TA list), upon expiry of a TAU timer, or a number of additional reasons. The MME may convert the TA reported by mobile terminal 102 in the TAU to the corresponding LA, report the LAI to the MSC, and transmit a TAU acceptance message (TAU Accept) to mobile terminal 102 that contains the LAI. Accordingly, the MSC may be able to track the location of mobile terminal 102 by way of the stream of LAIs reported by the MME while mobile terminal 102 remain informed of the LAI of the legacy network in which mobile terminal 102 is currently registered.

It may therefore be advantageous for mobile terminal 102 to select a legacy cell in 320 that belongs to the currently registered LAI, which may allow the MSC to promptly identify the presence of mobile terminal 102 on the legacy network. If mobile terminal 102 selects a legacy cell that is located in a different LAI than the currently registered LAI, mobile terminal 102 may need to perform an LAU (at legacy circuit 210b) with the legacy network in order to notify the MSC of the new LAI. Furthermore, if mobile terminal 102 selects a legacy cell that is served by a different MSC than the MSC at which mobile terminal 102 is currently registered, mobile terminal 102 may additionally need to perform an MSC switch procedure. Mobile terminal 102 may therefore expedite the legacy reselection procedure by selecting a legacy cell that belongs to the currently registered LAI.

Accordingly, physical layer processing circuit 208 may additionally determine the LA of each detected legacy cell and report the LA to LTE circuit 210a as part of the associated cell information in 308. LTE circuit 210 may thus store the LA of each detected legacy cell in the legacy cell database in 310 and may subsequently apply the LAs of the detected legacy cells in the selection stage of 320.

Specifically, LTE circuit 210a may identify the currently registered LA, i.e. the LAI reported to LTE circuit 210a by the MME in the most recent TAU accept or attach accept message, and may rank the legacy cells of the legacy cell database based on which legacy cells belong to the currently registered LA. LTE circuit 210a may additionally identify legacy cells that belong to forbidden LAs and/or forbidden LAs for regional provision of service and rank such legacy cells lowest.

Accordingly, in selecting a legacy cell from the legacy cell database in 320 LTE circuit 210a may rank the cells of the legacy cell database according to suitability criteria that depends on one or more of received signal strength/quality, PLMN, and LA. Skilled persons will appreciate the potential to apply a variety of different suitability criteria to perform the cell ranking.

Alternative to performing the suitability criteria ranking logic at legacy cell selection in 320, LTE circuit 210a may instead perform the suitability criteria ranking logic upon generation or update of the legacy cell database in 310. For example, LTE circuit 210a may apply the suitability criteria ranking logic at 310 each time a set of detected legacy cells is received from physical layer processing circuit 208. Accordingly, LTE circuit 210 may re-rank the legacy cells of the legacy cell database based on the most recent legacy cells reported by physical layer processing circuit 208. For example, returning to the graphical cell mapping depiction of FIG. 4, each time that LTE circuit 210a receives a set of detected legacy cells from physical layer processing circuit 208 in 308, LTE circuit may update the cell mapping for the current LTE cell, e.g. LTE cell A, according to the suitability criteria ranking logic. In the exemplary scenario of FIG. 4, UMTS cell 1 may e.g. belong the current RPLMN (the PLMN of LTE cell A) and may belong to LA that corresponds to the TA of LTE cell A; accordingly LTE circuit 210a may rank UMTS cell 1 as the highest-ranked UMTS cell. LTE circuit 210a may similarly apply the suitability criteria ranking logic to rank each of UMTS cells 2 and 3 and GSM cells 4, 5, and 6 to arrive at the "ranked" cell mapping depicted in FIG. 4. If mobile terminal 102 transfers (reselection or handover) to LTE cell B, LTE circuit 210a may generate the ranked cell mapping for LTE cell B in 310 upon receiving a set of detected legacy cells from physical layer processing circuit 208 by similarly applying the suitability criteria ranking logic. LTE circuit 210a may then continue to generate (if no cell mapping exists for the currently attached LTE cell) or update (if a cell mapping exists for the currently attached LTE cell) such ranked cell mappings in 310 following receipt of a set of detected legacy cells from physical layer processing circuit 208 in 308.

In such a configuration where LTE circuit 210a applies the suitability criteria ranking logic in 310, LTE circuit 210a may apply the suitability criteria ranking logic as either part of the AS or NAS protocols. For example, the AS protocol (e.g. RRC layer) of LTE circuit 210a may be responsible for triggering the legacy radio measurement at physical layer processing circuit 208 at 304, which may subsequently perform the legacy radio measurements and provide the results back to the AS protocol. The AS protocol may then either provide the NAS protocol (e.g. EMM layer) with the provided legacy cells or may first apply the suitability criteria ranking logic to the detected legacy cells and subsequently provide the NAS protocol with a ranked list of detected legacy cells. In the former case, the NAS protocol may apply the suitability criteria ranking logic before generating/updating the legacy cell database in 310. Conversely, in the latter case the NAS protocol may generate/update the legacy cell database in 310 with the ranked legacy cell list provided by the AS protocol.

Continuing with the implementation in which the AS protocol of LTE circuit 210*a* provides the NAS protocol of LTE circuit 210*a* with a ranked list of detected legacy cells, controller 210 may simplify generation and update of the legacy cell database by having the AS protocol only report the highest ranked detected legacy cells to the NAS protocol for recordation in the legacy cell database. For example, the AS protocol (e.g. RRC layer) may receive the detected legacy cells from physical layer processing circuit 208 and subsequently apply the suitability criteria ranking logic to obtain a ranked list of detected legacy cells, i.e. where legacy cells that have high signal strength/quality, a desired PLMN, and/or a desired LA are ranked highest. The AS protocol may then only provide the highest ranked detected legacy cells to the NAS protocol for recordation in the legacy cell database. Alternatively, in an implementation where the NAS protocol applies the suitability criteria ranking logic, the NAS protocol may receive an (unranked) list of detected legacy cells from the AS protocol, apply the suitability criteria ranking logic to obtain a ranked list of detected legacy cells, and only store the highest ranked of the detected legacy cells in the legacy cell database. Such procedures may simplify maintenance of the legacy cell database and may allow LTE circuit 210*a* to avoid having to store excessive quantities of detected legacy cells in the legacy cell database.

Furthermore, while FIG. 3 depicts the suitability criteria ranking logic and legacy cell database maintenance in 310 and 320, respectively, as part of LTE circuit 210*a*, controller 210 may alternatively implement one or both of the suitability criteria ranking and cell selection logic at legacy circuit 210*b*. For example, LTE circuit 210*a* may receive the detected legacy cells from physical layer controller 208 in 308 and provide the detected legacy cells to legacy circuit 210*b*, which may either apply the suitability criteria ranking logic to the legacy cells and store the legacy cells as a ranked list in the legacy cell database at 310 or may store the legacy cells in the legacy cell database in 310 before applying the suitability criteria ranking logic to select a legacy cell in 320. Alternatively, physical layer processing circuit 208 may provide the legacy cells directly to legacy circuit 210*b* (as opposed to first reporting the legacy cells to LTE circuit 210*a*). Skilled persons will appreciate various such modifications that are within the scope of this disclosure.

Figure 5:
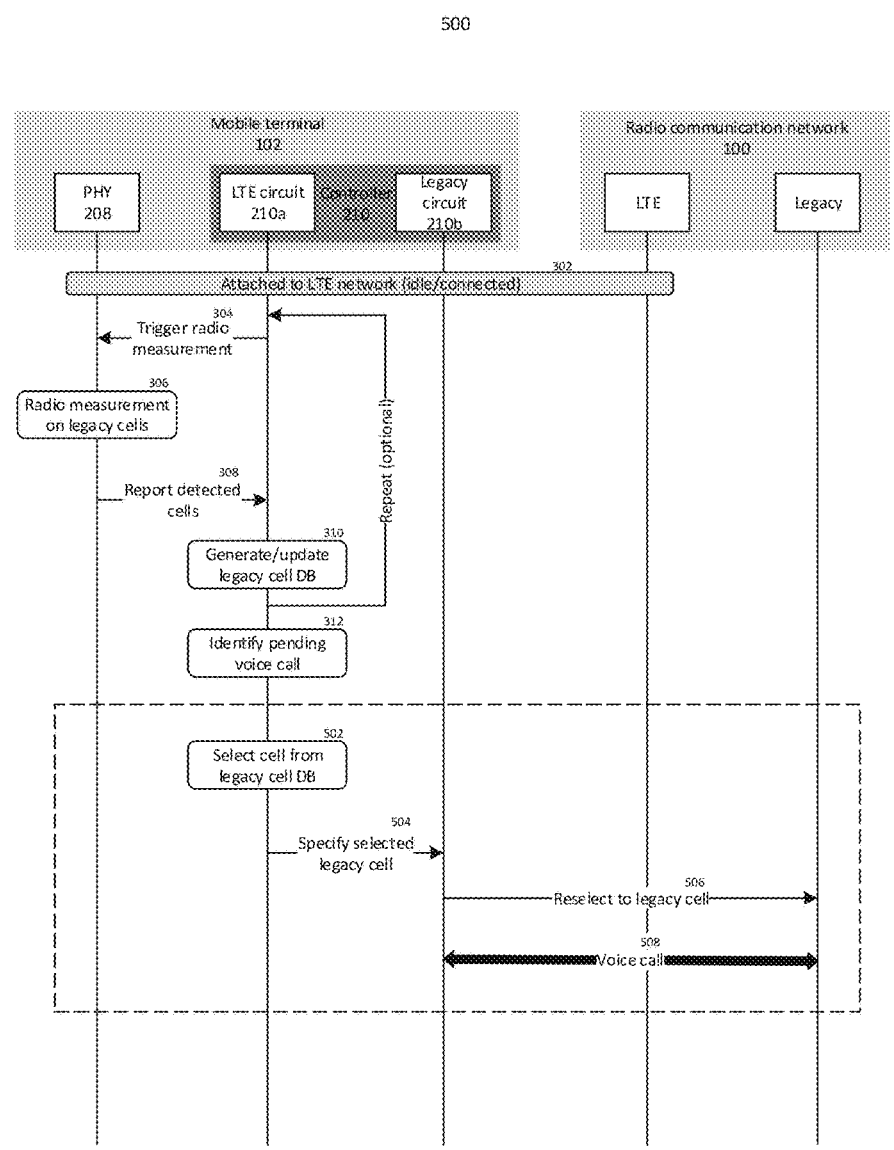
FIG. 5 shows a message sequence chart for another CSFB procedure.

As previously indicated, controller 210 may additionally apply the legacy cell database to skip Extended Service Request procedures altogether and instead perform autonomous reselection to the legacy network with a selected cell from the legacy cell database. FIG. 5 depicts message sequence chart 500 that illustrates the signaling between mobile terminal 102 and radio communication network 100 involved in such a 'skip' of Extended Service Request procedures.

As shown in FIG. 5, the procedure of message sequence chart 500 may include stages 302-312 that are identical to as in message sequence chart 500. Accordingly, mobile terminal 102 may similarly perform radio measurements, establish and update the legacy cell database, and identify a pending voice call in 302-312. However, instead of transmitting an Extended Service Request to the LTE network in 314, LTE circuit 210*a* may skip the Extended Service Request procedures and proceed to autonomously perform reselection to the legacy network. As shown in FIG. 5, LTE circuit 210*a* may select a cell from the legacy cell database in 502 and provide the selected legacy cell to legacy circuit 210*b* in 504 (analogous to the procedures of 318 and 320 as previously detailed). Legacy circuit 210*b* may then proceed to reselect to the legacy cell and execute the voice call in 506 and 508 (analogous to the procedures of 324 and 326 as previously detailed).

Accordingly, mobile terminal 102 may skip Extended Service Procedures altogether. Instead of having to wait for a response from the MME in the form of a handover or redirect command, mobile terminal 102 may instead proceed straight to reselection to the legacy network based on a legacy cell selected from the legacy cell database. Although mobile terminal 102 may forego assistance from the MME in skipping Extended Service Request procedures, mobile terminal 102 may be able to expedite the legacy reselection procedure and potentially engage in the pending voice call at an earlier time.

The procedure of message sequence chart 500 may be particularly applicable in the event of an emergency call, which mobile terminal 102 may aim to complete as quickly as possible due to the associated urgency. Accordingly, upon identifying a pending voice call in 312 that is an emergency call, LTE circuit 210*a* may decide to skip Extended Service Request procedures and instead proceed directly to 502 to select a legacy cell from the legacy cell database in 502. As emergency calls are able to be placed on substantially all cells (i.e. on forbidden PLMNs, in forbidden LAs/TA, etc.), mobile terminal 102 may have greater freedom in selecting the legacy cell in 502. LTE circuit 210*a* may thus place a greater emphasis on quickly selecting a cell, even if such cells only provide limited service as substantially all cells will be eligible for placing an emergency call.

Figure 6:
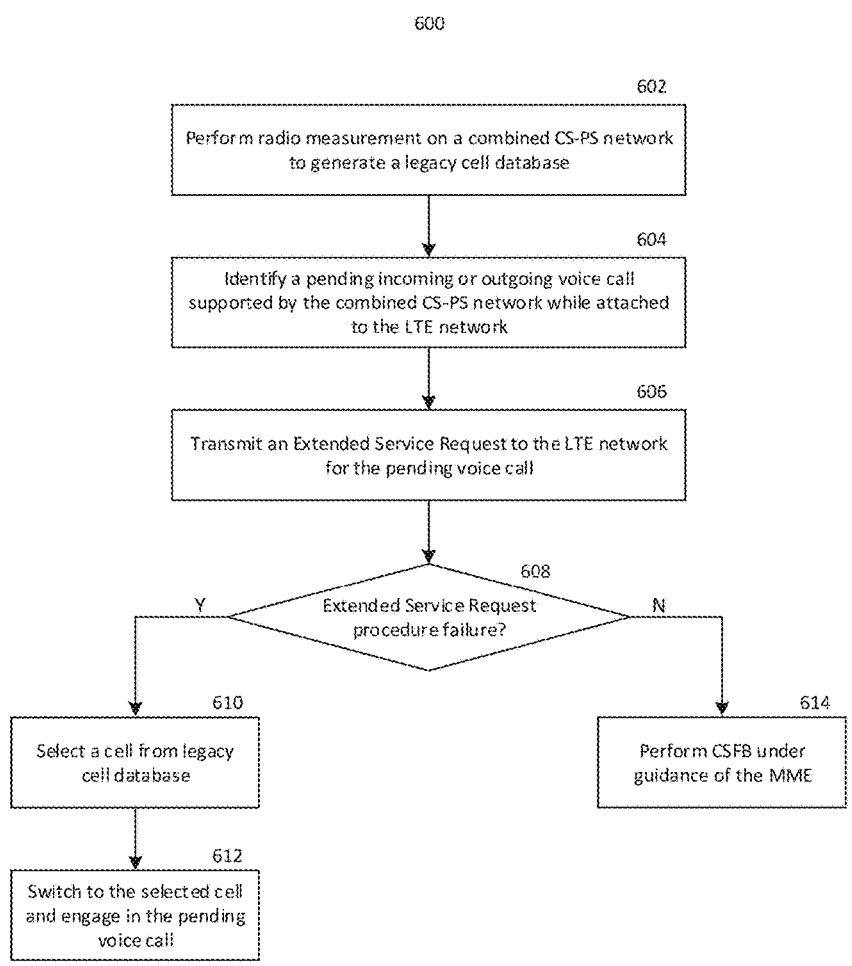
FIG. 6 shows a flow chart for a first method of performing Extended Service Request procedures.

FIG. 6 shows a flow chart illustrating method 600 for handling Extended Service Request failure, which may be a counterpart method to as detailed regarding message sequence chart 300 and may be performed by mobile terminal 102. As shown in FIG. 6, mobile terminal 102 (physical layer processing circuit 208) may perform radio measurement on the combined CS-PS legacy network to generate the legacy cell database at 602, which as previously detailed regarding FIG. 3 may be triggered by controller 210. Mobile terminal 102 (controller 210) may then identify a pending incoming or outgoing voice call supported by the legacy network in 604, i.e. may identify either a mobile originating or mobile terminating CS call on the legacy network via user input or notification by the LTE network. Mobile terminal 102 (controller 210) may then transmit an Extended Service Request to the LTE network (MME) for the pending voice call in 606, i.e. may initiate Extended Service Request procedures for the pending voice call.

In normal operational procedures, the MME may then either provide a handover or redirect command in order to assist mobile terminal 102 in transferring to the legacy network to engage in the pending voice call at 614. However, in the context of method 600, the Extended Service Procedure may fail at 608. Mobile terminal 102 (controller 210) may thus select a legacy cell from the legacy cell database in 610, which mobile terminal 102 may select based on predetermined suitability criteria ranking logic including PLMN, LA/TA, received signal strength/quality, etc. Mobile terminal 102 (controller 210) may then switch to the selected legacy cell in 612 and proceed to engage in the pending voice call. Accordingly, mobile terminal 102 may promptly recover from Extended Service Request procedure failure by having the legacy cell database prepared in advance (by virtue of 602) and employing the legacy cell database to quickly select a legacy cell for autonomous reselection to the legacy network.

Figure 7:
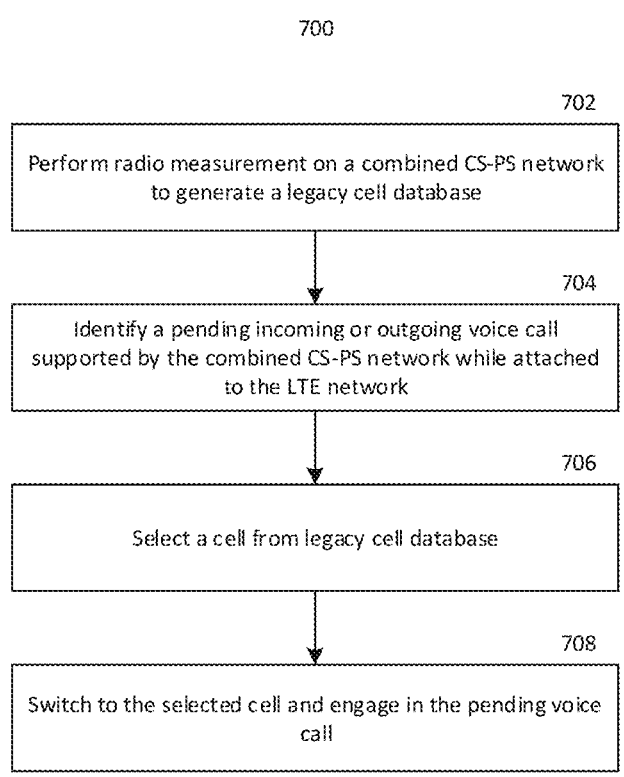
FIG. 7 shows a flow chart for a second method of performing Extended Service Request procedures.

Mobile terminal 102 may alternatively skip Extended Service Request procedures altogether, i.e. may not transmit an Extended Service Request to the LTE network for the pending voice call and may instead autonomously perform reselection to the legacy network with a selected legacy cell from the legacy ell database. Such may be advantageous in allowing mobile terminal 102 to potentially complete expedited reselection to the legacy network (as mobile terminal 102 may not need to wait for explicit handover/redirect commands and guidance from the MME), which may be particularly suitable if the pending voice call is an emergency call. FIG. 7 shows method 700 in which mobile terminal 102 may skip Extended Service Request procedures. Similarly as to 602 and 604, mobile terminal 102 may perform radio measurement on the combined CS-PS legacy network to generate the legacy cell database and identify a pending incoming or outgoing voice call supported by the legacy network in 702 and 704, respectively. Instead of transmitting an Extended Service Request to the LTE network (the MME) for the pending voice call, mobile terminal 102 (controller 210) may instead autonomously perform reselection to the legacy network by selecting a legacy cell from the legacy cell database in 706 (controller 210. i.e. based on the suitability criteria ranking logic) and switching to the selected cell and engaging in the pending voice call in 708.

Figure 8:
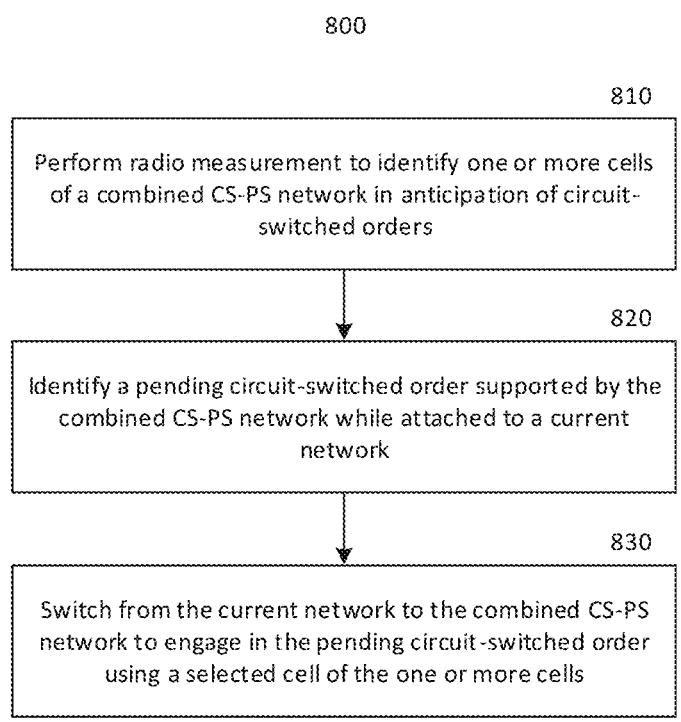
FIG. 8 shows a first method of performing radio communications.

FIG. 8 shows method 800 of performing radio communications. As shown in FIG. 8, method 800 includes performing radio measurement to identify one or more cells of a combined CS-PS network in anticipation of circuit-switched orders (810), identifying a pending circuit-switched order supported by the combined CS-PS network while attached to a current network (820), and switching from the current network to the combined CS-PS network to engage in the pending circuit-switched order using a selected cell of the one or more cells (830).

Figure 9:
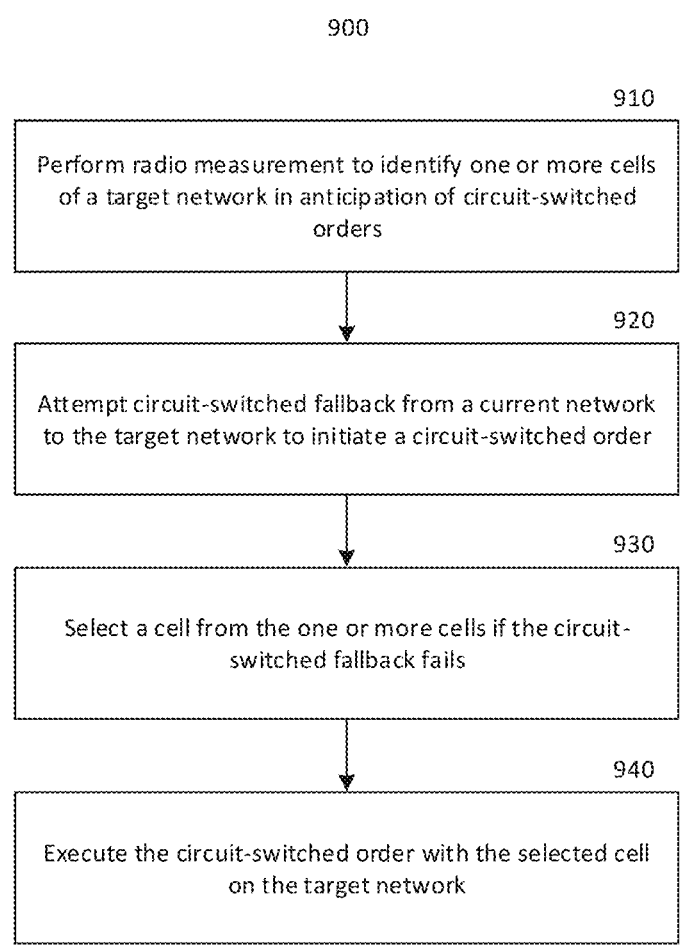
FIG. 9 shows a second method of performing radio communications.

FIG. 9 shows method 900 of performing radio communications. As shown in FIG. 9, method 900 includes performing radio measurement to identify one or more cells of a target network in anticipation of circuit-switched orders (910), attempting circuit-switched fallback from a current network to the target network to initiate a circuit-switched order (920), selecting a cell from the one or more cells if the circuit-switched fallback fails (930), and executing the circuit-switched order with the selected cell on the target network (930).

In one or more further exemplary aspects of the disclosure, one or more of the features described above in reference to FIGS. 1-7 may be further incorporated into method 800 and/or 900. In particular, method 800 and/or 900 may be configured to perform further and/or alternate operations as detailed regarding mobile terminal 102 and/or controller 210.

The terms "user equipment", "UE", "mobile terminal", "user terminal", etc., may apply to any wireless communication device, including cellular phones, tablets, laptops, personal computers, wearables, multimedia playback and other handheld electronic devices, consumer/home/office/commercial appliances, vehicles, and any number of additional electronic devices capable of wireless communications.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

The following examples pertain to further examples of this disclosure:

Example 1 is a method of performing radio communications, the method including performing radio measurement to identify one or more cells of a combined CS-PS network in anticipation of circuit-switched orders, identifying a pending circuit-switched order supported by the combined CS-PS network while attached to a current network, and switching from the current network to the combined CS-PS network to engage in the pending circuit-switched order using a selected cell of the one or more cells.

In Example 2, the subject matter of Example 1 can optionally further include selecting the selected cell from the one or more cells according to a selection criteria.

In Example 3, the subject matter of Example 1 can optionally include wherein performing the radio measurement to identify the one or more cells of the combined CS-PS network in anticipation of circuit-switched orders includes processing radio signals received on the combined CS-PS network to obtain one or more radio measurements and one or more cell parameters for each of the one or more cells, the method further including selecting the selected cell from the one or more cells by applying a selection criteria to the one or more radio measurements and the one or more cell parameters of the one or more cells.

In Example 4, the subject matter of Example 2 or 3 can optionally include wherein the selection criteria is dependent on one or more of received signal strength, received signal quality, network identity, or location information.

In Example 5, the subject matter of Example 1 can optionally further include identifying one or more first cells from the one or more cells that have the highest received signal strength, and selecting the selected cell from the one or more first cells.

In Example 6, the subject matter of Example 1 can optionally further include identifying one or more second cells from the one or more cells that have the highest received signal quality, and selecting the selected cell from the one or more second cells.

In Example 7, the subject matter of Example 1 can optionally further include identifying one or more third cells from the one or more cells that relate to either the same network as a current serving cell or an equivalent serving cell of the current serving cell, and selecting the selected cell from the one or more third cells.

In Example 8, the subject matter of Example 1 can optionally further include identifying one or more fourth cells from the one or more cells that have matching location information to a current serving cell, and selecting the selected cell from the one or more fourth cells.

In Example 9, the subject matter of Example 8 can optionally include wherein identifying the one or more fourth cells from the one or more cells that have matching location identity information to the current serving cell includes identifying a Location Area (LA) corresponding to the current serving cell, and identifying one or more of the one or more cells belong to the LA as the one or more fourth cells.

In Example 10, the subject matter of Example 9 can optionally include wherein identifying the LA corresponding to the current serving cell includes receiving an attach accept message or a tracking area accept message from the current network, and identifying the LA from the attach accept message or the tracking area accept message.

In Example 11, the subject matter of any one of Examples 1 to 10 can optionally include wherein performing the radio measurement to identify the one or more cells of the combined CS-PS network in anticipation of the circuit-switched orders includes performing the radio measurement on the combined CS-PS network when a new serving cell is selected, or performing the radio measurement on the combined CS-PS network when a measurement timer expires.

In Example 12, the subject matter of any one of Examples 1 to 10 can optionally further include performing one or more cell reselection procedures on the current network, wherein performing the radio measurement to identify the one or more cells of the combined CS-PS network in anticipation of the circuit-switched orders includes performing the radio measurement on the combined CS-PS network after performing each of the one or more cell reselection procedures.

In Example 13, the subject matter of Example 1 or 12 can optionally further include initiating a timer following a first cell reselection procedure, wherein performing the radio measurement to identify the one or more cells of the combined CS-PS network in anticipation of the circuit-switched orders includes performing the radio measurement on the combined CS-PS network if the timer expires before performing a subsequent cell reselection procedure.

In Example 14, the subject matter of any one of Examples 1 to 13 can optionally include wherein the pending circuit-switched order is an incoming call, and wherein identifying the pending circuit-switched order supported by the combined CS-PS network while attached to the current network includes receiving a notification from the current network that specifies the incoming call.

In Example 15, the subject matter of Example 14 can optionally include wherein receiving the notification from the current network that specifies the incoming call includes receiving an idle mode paging message for the incoming call from the current network.

In Example 16, the subject matter of Example 14 can optionally include wherein receiving the notification from the current network that specifies the incoming call includes receiving a connected mode notification message for the incoming call from the current network.

In Example 17, the subject matter of any one of Examples 1 to 13 can optionally include wherein the pending circuit-switched order is an outgoing call, and wherein identifying the pending circuit-switched order supported by the combined CS-PS network while attached to the current network includes receiving input from a user that triggers the outgoing call.

In Example 18, the subject matter of any one of Examples 1 to 17 can optionally further include performing an initial attempt to switch from the current network to the combined CS-PS network under the guidance of the current network, wherein switching from the current network to the combined CS-PS network to engage in the pending circuit-switched order using a selected cell of the one or more cells includes when the initial attempt to switch from the current network to the combined CS-PS network fails, switching from the current network to the combined CS-PS network to engage in the pending circuit-switched order using the selected cell.

In Example 19, the subject matter of Example 18 can optionally include wherein performing the initial attempt to switch from the current network to the combined CS-PS network under the guidance of the current network includes attempting to perform Circuit-Switched Fallback (CSFB) from the current network to the combined CS-PS network for the pending circuit-switched order.

In Example 20, the subject matter of Example 18 can optionally include wherein performing the initial attempt to switch from the current network to the combined CS-PS network under the guidance of the current network includes transmitting an Extended Service Request for the pending circuit-switched order to the current network.

In Example 21, the subject matter of Example 20 can optionally further include determining that the initial attempt has failed if no response is received for the Extended Service Request within a finite time period or if a failure notification is received.

In Example 22, the subject matter of any one of Examples 1 to 21 can optionally include wherein switching from the current network to the combined CS-PS network to engage in the pending circuit-switched order using the selected cell of the one or more cells includes performing cell reselection from a current serving cell of the current network to the selected cell.

In Example 23, the subject matter of any one of Examples 1 to 22 can optionally include wherein the current network is a different radio access technology than the combined CS-PS network.

In Example 24, the subject matter of any one of Examples 1 to 23 can optionally include wherein the current network does not support the circuit-switched order.

In Example 25, the subject matter of any one of Examples 1 to 24 can optionally include wherein the current network is a Long Term Evolution (LTE) network and the combined CS-PS network is a Global System for Mobile Communications (GSM) network or a Universal Mobile Telecommunications System (UMTS) network.

In Example 26, the subject matter of any one of Examples 1 to 25 can optionally include wherein performing the radio measurement to identify the one or more cells of the combined CS-PS network in anticipation of circuit-switched orders includes performing inter-radio access technology (inter-RAT) radio measurement on the combined CS-PS network while attached to the current network to identify the one or more cells.

In Example 27, the subject matter of Example 26 can optionally include wherein performing the inter-RAT radio measurement on the combined CS-PS network while attached to the current network to identify the one or more cells includes performing the inter-RAT radio measurement in connected mode or idle mode.

Example 28 is a non-transitory computer readable medium storing instructions that when executed by a controller of a radio communication device cause the radio communication device to perform the method of any one of Examples 1 to 27.

Example 29 is a radio communication device configured to perform the method of any one of Examples 1 to 27.

Example 30 is a controller for a radio communication device configured to support execution of hardware and/or software logic to perform the method of any one of Examples 1 to 27.

Example 31 is a method of performing radio communications, the method including performing radio measurement to identify one or more cells of a target network in anticipation of circuit-switched orders, attempting circuit-switched fallback from a current network to the target network to initiate a circuit-switched order, selecting a cell from the one or more cells if the circuit-switched fallback fails, and executing the circuit-switched order with the selected cell on the target network.

In Example 32, the subject matter of Example 31 can optionally include wherein selecting the cell from the one or more cells if the circuit-switched fallback fails includes selecting the selected cell from the one or more cells according to selection criteria dependent on one or more of received signal strength, received signal quality, network identity, or location information.

In Example 33, the subject matter of Example 31 can optionally include wherein performing the radio measurement to identify the one or more cells of the target network in anticipation of circuit-switched orders includes processing radio signals received on the target network to obtain one or more radio measurements and one or more cell parameters for each of the one or more cells, wherein selecting the cell from the one or more cells if the circuit-switched fallback fails includes selecting the cell from the one or more cells by applying a selection criteria to the one or more radio measurements and the one or more cell parameters of the one or more cells.

In Example 34, the subject matter of Example 33 can optionally include wherein the selection criteria is dependent on one or more of received signal strength, received signal quality, network identity, or location information.

In Example 35, the subject matter of Example 31 can optionally include wherein selecting the cell from the one or more cells if the circuit-switched fallback fails includes identifying one or more first cells from the one or more cells that have the highest received signal strength, and selecting the selected cell from the one or more first cells.

In Example 36, the subject matter of Example 31 can optionally include wherein selecting the cell from the one or more cells if the circuit-switched fallback fails includes identifying one or more second cells from the one or more cells that have the highest received signal quality, and selecting the selected cell from the one or more second cells.

In Example 37, the subject matter of Example 31 can optionally include wherein selecting the cell from the one or more cells if the circuit-switched fallback fails includes identifying one or more third cells from the one or more cells that relate to either the same network as a current serving cell or an equivalent serving cell of the current serving cell, and selecting the selected cell from the one or more third cells.

In Example 38, the subject matter of Example 31 can optionally include wherein selecting the cell from the one or more cells if the circuit-switched fallback fails includes identifying one or more fourth cells from the one or more cells that have matching location information to a current serving cell, and selecting the selected cell from the one or more fourth cells.

In Example 39, the subject matter of Example 38 can optionally include wherein identifying the one or more fourth cells from the one or more cells that have matching location information to the current serving cell includes identifying a Location Area (LA) corresponding to the current serving cell, and identifying one or more of the one or more cells belong to the LA as the one or more fourth cells.

In Example 40, the subject matter of Example 39 can optionally include wherein identifying the LA corresponding to the current serving cell includes receiving an attach accept message or a tracking area accept message from the current network, and identifying the LA from the attach accept message or the tracking area accept message.

In Example 41, the subject matter of any one of Examples 31 to 40 can optionally include wherein performing the radio measurement to identify the one or more cells of the target network in anticipation of circuit-switched orders includes performing the radio measurement on the target network when a new serving cell is selected, or performing the radio measurement on the target network when a measurement timer expires.

In Example 42, the subject matter of any one of Examples 31 to 40 can optionally further include performing one or more cell reselection procedures on the current network, wherein performing the radio measurement to identify the one or more cells of the target network in anticipation of the circuit-switched orders includes performing the radio measurement on the target network after each of the one or more cell reselection procedures.

In Example 43, the subject matter of Example 31 or 42 can optionally further include initiating a timer following a first cell reselection procedure, wherein performing the radio measurement to identify the one or more cells of the target network in anticipation of the circuit-switched orders includes performing the radio measurement on the target network if the timer expires before performing a subsequent cell reselection procedure.

In Example 44, the subject matter of any one of Examples 31 to 43 can optionally include wherein the circuit-switched order is an incoming call, and wherein attempting the circuit-switched fallback from the current network to the target network to initiate the circuit-switched order includes attempting the circuit-switched fallback after receiving a notification from the current network that identifies the incoming call.

In Example 45, the subject matter of Example 44 can optionally further include receiving the notification from the current network that identifies the incoming call as an idle mode paging message.

In Example 46, the subject matter of any one of Examples including receiving the can optionally include from the current network that specifies the incoming call as a connected mode notification message.

In Example 47, the subject matter of any one of Examples 31 to 43 can optionally include wherein the circuit-switched order is an outgoing call, and wherein attempting the circuit-switched fallback from the current network to the target network to initiate the circuit-switched order includes attempting the circuit-switched fallback after receiving input from a user that triggers the outgoing call.

In Example 48, the subject matter of any one of Examples 31 to 47 can optionally include wherein attempting the circuit-switched fallback from the current network to the target network to initiate the circuit-switched order includes transmitting an Extended Service Request to the current network.

In Example 49, the subject matter of Example 48 can optionally further include determining that the circuit-switched fallback has failed if no response is received for the Extended Service Request within a finite time period or if a failure notification is received.

In Example 50, the subject matter of any one of Examples 31 to 49 can optionally further include performing cell reselection from a current serving cell of the current network to the selected cell prior to executing the circuit-switched order with the selected cell on the target network.

In Example 51, the subject matter of any one of Examples 31 to 50 can optionally include wherein the current network is a different radio access technology than the target network.

In Example 52, the subject matter of any one of Examples 31 to 51 can optionally include wherein the current network does not support the circuit-switched order.

In Example 53, the subject matter of any one of Examples 31 to 52 can optionally include wherein the current network is a Long Term Evolution (LTE) network and the target network is a Global System for Mobile Communications (GSM) network or a Universal Mobile Telecommunications System (UMTS) network.

In Example 54, the subject matter of any one of Examples 31 to 53 can optionally include wherein performing the radio measurement to identify the one or more cells of the target network in anticipation of circuit-switched orders includes performing inter-radio access technology (inter-RAT) radio measurement on the target network while attached to the current network to identify the one or more cells.

In Example 55, the subject matter of Example 54 can optionally include wherein performing the inter-radio access technology (inter-RAT) radio measurement on the target network while attached to the current network to identify the one or more cells includes performing the inter-RAT radio measurement in connected mode or idle mode.

Example 56 is a non-transitory computer readable medium storing instructions that when executed by a controller of a radio communication device cause the radio communication device to perform the method of any one of Examples 31 to 55.

Example 57 is a radio communication device configured to perform the method of any one of Examples 31 to 55.

Example 58 is a controller for a radio communication device configured to support execution of hardware and/or software logic to perform the method of any one of Examples 31 to 55.

Example 59 is a radio communication device including a measurement circuit configured to perform radio measurement to identify one or more cells of a combined CS-PS network in anticipation of circuit-switched orders, and a control circuit configured to identify a pending circuit-switched order supported by the combined CS-PS network while attached to a current network, and switch from the current network to the combined CS-PS network to engage in the pending circuit-switched using a selected cell of the one or more cells.

In Example 60, the subject matter of Example 59 can optionally further include a radio transceiver and an antenna system, wherein the control circuit is configured to direct the transmission and reception of radio signals via the radio transceiver and the antenna system.

In Example 61, the subject matter of Example 59 can optionally include wherein the control circuit is further configured to select the selected cell from the one or more cells according to a selection criteria.

In Example 62, the subject matter of Example 59 can optionally include wherein the measurement circuit is configured to perform the radio measurement to identify the one or more cells of the combined CS-PS network in anticipation of circuit-switched orders by processing radio signals received on the combined CS-PS network to obtain one or more radio measurements and one or more cell parameters for each of the one or more cells, the control circuit further configured to select the selected cell from the one or more cells by applying a selection criteria to the one or more radio measurements and the one or more cell parameters of the one or more cells.

In Example 63, the subject matter of Example 61 or 62 can optionally include wherein the selection criteria is dependent on one or more of received signal strength, received signal quality, network identity, or location information.

In Example 64, the subject matter of Example 59 or 60 can optionally include wherein the control circuit is further configured to identify one or more first cells from the one or more cells that have the highest received signal strength, and select the selected cell from the one or more first cells.

In Example 65, the subject matter of Example 59 or 60 can optionally include wherein the control circuit is further configured to identify one or more second cells from the one or more cells that have the highest received signal quality, and select the selected cell from the one or more second cells.

In Example 66, the subject matter of Example 59 or 60 can optionally include wherein the control circuit is further configured to identify one or more third cells from the one or more cells that relate to either the same network as a current serving cell or an equivalent serving cell of the current serving cell, and select the selected cell from the one or more third cells.

In Example 67, the subject matter of Example 59 or 60 can optionally include wherein the control circuit is further configured to identify one or more fourth cells from the one or more cells that have matching location information to a current serving cell, and select the selected cell from the one or more fourth cells.

In Example 68, the subject matter of Example 67 can optionally include wherein the control circuit is configured to identify the one or more fourth cells from the one or more cells that have matching location identity information to the current serving cell by identifying a Location Area (LA) corresponding to the current serving cell, and identifying one or more of the one or more cells belong to the LA as the one or more fourth cells.

In Example 69, the subject matter of Example 68 can optionally include wherein the control circuit is configured to identify the LA corresponding to the current serving cell by receiving an attach accept message or a tracking area accept message from the current network, and identifying the LA from the attach accept message or the tracking area accept message.

In Example 70, the subject matter of any one of Examples 59 to 69 can optionally include wherein the measurement circuit is configured to perform the radio measurement to identify the one or more cells of the combined CS-PS network in anticipation of the circuit-switched orders by performing the radio measurement on the combined CS-PS network when a new serving cell is selected, or performing the radio measurement on the combined CS-PS network when a measurement timer expires.

In Example 71, the subject matter of any one of Examples 59 to 69 can optionally include wherein the control circuit is further configured to perform one or more cell reselection procedures on the current network, and wherein the control circuit is configured to perform the radio measurement to identify the one or more cells of the combined CS-PS network in anticipation of the circuit-switched orders by performing the radio measurement on the combined CS-PS network after performing each of the one or more cell reselection procedures.

In Example 2, the subject matter of Example 59 or 71 can optionally include wherein the control circuit is further configured to initiate a timer following a first cell reselection procedure, and wherein the control circuit is configured to perform the radio measurement to identify the one or more cells of the combined CS-PS network in anticipation of the circuit-switched orders by performing the radio measurement on the combined CS-PS network if the timer expires before performing a subsequent cell reselection procedure.

In Example 73, the subject matter of any one of Examples 59 to 72 can optionally include wherein the pending circuit-switched order is an incoming call, and wherein the control circuit is configured to identify the pending circuit-switched order supported by the combined CS-PS network while attached to the current network by receiving a notification from the current network that specifies the incoming call.

In Example 74, the subject matter of Example 73 can optionally include wherein the control circuit is configured to receive the notification from the current network that specifies the incoming call by receiving an idle mode paging message for the incoming call from the current network.

In Example 75, the subject matter of Example 73 can optionally include wherein the control circuit is configured to receive the notification from the current network that specifies the incoming call by receiving a connected mode notification message for the incoming call from the current network.

In Example 76, the subject matter of any one of Examples 59 to 72 can optionally include wherein the pending circuit-switched order is an outgoing call, and wherein the control circuit is configured to identify the pending circuit-switched order supported by the combined CS-PS network while attached to the current network by receiving input from a user that triggers the outgoing call.

In Example 77, the subject matter of any one of Examples 59 to 76 can optionally include wherein the control circuit is further configured to perform an initial attempt to switch from the current network to the combined CS-PS network under the guidance of the current network, and wherein the control circuit is configured to switch from the current network to the combined CS-PS network to engage in the pending circuit-switched order using a selected cell of the one or more cells by when the initial attempt to switch from the current network to the combined CS-PS network fails, switching from the current network to the combined CS-PS network to engage in the pending circuit-switched order using the selected cell.

In Example 78, the subject matter of Example 77 can optionally include wherein the control circuit is configured to perform the initial attempt to switch from the current network to the combined CS-PS network under the guidance of the current network by attempting to perform Circuit-Switched Fallback (CSFB) from the current network to the combined CS-PS network for the pending circuit-switched order.

In Example 79, the subject matter of Example 77 can optionally include wherein the control circuit is configured to perform the initial attempt to switch from the current network to the combined CS-PS network under the guidance of the current network by transmitting an Extended Service Request for the pending circuit-switched order to the current network.

In Example 80, the subject matter of Example 79 can optionally include wherein the control circuit is further configured to determine that the initial attempt has failed if no response is received for the Extended Service Request within a finite time period or if a failure notification is received.

In Example 81, the subject matter of any one of Examples 59 to 80 can optionally include wherein the control circuit is configured to switch from the current network to the combined CS-PS network to engage in the pending circuit-switched order using the selected cell of the one or more cells by performing cell reselection from a current serving cell of the current network to the selected cell.

In Example 82, the subject matter of any one of Examples 59 to 81 can optionally include wherein the current network is a different radio access technology than the combined CS-PS network.

In Example 83, the subject matter of any one of Examples 59 to 82 can optionally include wherein the current network does not support the circuit-switched order.

In Example 84, the subject matter of any one of Examples 59 to 83 can optionally include wherein the current network is a Long Term Evolution (LTE) network and the combined CS-PS network is a Global System for Mobile Communications (GSM) network or a Universal Mobile Telecommunications System (UMTS) network.

In Example 85, the subject matter of any one of Examples 59 to 84 can optionally include wherein the measurement circuit is configured to perform the radio measurement to identify the one or more cells of the combined CS-PS network in anticipation of circuit-switched orders by performing inter-radio access technology (inter-RAT) radio measurement on the combined CS-PS network while attached to the current network to identify the one or more cells.

In Example 86, the subject matter of Example 85 can optionally include wherein the measurement circuit is configured to perform the inter-RAT radio measurement on the combined CS-PS network while attached to the current network to identify the one or more cells by performing the inter-RAT radio measurement in connected mode or idle mode.

Example 87 is a non-transitory computer readable medium storing instructions that when executed by a controller of a radio communication device control the radio communication device to perform a method including performing radio measurement to identify one or more cells of a combined CS-PS network in anticipation of circuit-switched orders, identifying a pending circuit-switched order supported by the combined CS-PS network while attached to a current network, and switching from the current network to the combined CS-PS network to engage in the pending circuit-switched order using a selected cell of the one or more cells.

In Example 88, the subject matter of Example 87 can optionally include wherein the method further includes selecting the selected cell from the one or more cells according to a selection criteria.

In Example 89, the subject matter of Example 87 can optionally include wherein performing the radio measurement to identify the one or more cells of the combined CS-PS network in anticipation of circuit-switched orders includes processing radio signals received on the combined CS-PS network to obtain one or more radio measurements and one or more cell parameters for each of the one or more cells, the method further including selecting the selected cell from the one or more cells by applying a selection criteria to the one or more radio measurements and the one or more cell parameters of the one or more cells.

In Example 90, the subject matter of Example 88 or 89 can optionally include wherein the selection criteria is dependent on one or more of received signal strength, received signal quality, network identity, or location information.

In Example 91, the subject matter of Example 87 can optionally include the method further including identifying one or more first cells from the one or more cells that have the highest received signal strength, and selecting the selected cell from the one or more first cells.

In Example 92, the subject matter of Example 87 can optionally include the method further including identifying one or more second cells from the one or more cells that have the highest received signal quality, and selecting the selected cell from the one or more second cells.

In Example 93, the subject matter of Example 87 can optionally include the method further including identifying one or more third cells from the one or more cells that relate to either the same network as a current serving cell or an equivalent serving cell of the current serving cell, and selecting the selected cell from the one or more third cells.

In Example 94, the subject matter of Example 87 can optionally include wherein the method further includes identifying one or more fourth cells from the one or more cells that have matching location information to a current serving cell, and selecting the selected cell from the one or more fourth cells.

In Example 95, the subject matter of Example 94 can optionally include wherein identifying the one or more fourth cells from the one or more cells that have matching location identity information to the current serving cell includes identifying a Location Area (LA) corresponding to the current serving cell, and identifying one or more of the one or more cells belong to the LA as the one or more fourth cells.

In Example 96, the subject matter of Example 95 can optionally include wherein identifying the LA corresponding to the current serving cell includes receiving an attach accept message or a tracking area accept message from the current network, and identifying the LA from the attach accept message or the tracking area accept message.

In Example 97, the subject matter of any one of Examples 87 to 96 can optionally include wherein performing the radio measurement to identify the one or more cells of the combined CS-PS network in anticipation of the circuit-switched orders includes performing the radio measurement on the combined CS-PS network when a new serving cell is selected, or performing the radio measurement on the combined CS-PS network when a measurement timer expires.

In Example 98, the subject matter of any one of Examples 87 to 96 can optionally include the method further including performing one or more cell reselection procedures on the current network, wherein performing the radio measurement to identify the one or more cells of the combined CS-PS network in anticipation of the circuit-switched orders includes performing the radio measurement on the combined CS-PS network after performing each of the one or more cell reselection procedures.

In Example 99, the subject matter of Example 87 or 98 can optionally include the method further including initiating a timer following a first cell reselection procedure, wherein performing the radio measurement to identify the one or more cells of the combined CS-PS network in anticipation of the circuit-switched orders includes performing the radio measurement on the combined CS-PS network if the timer expires before performing a subsequent cell reselection procedure.

In Example 100, the subject matter of any one of Examples 87 to 99 can optionally include wherein the pending circuit-switched order is an incoming call, and wherein identifying the pending circuit-switched order supported by the combined CS-PS network while attached to the current network includes receiving a notification from the current network that specifies the incoming call.

In Example 101, the subject matter of Example 100 can optionally include wherein receiving the notification from the current network that specifies the incoming call includes receiving an idle mode paging message for the incoming call from the current network.

In Example 102, the subject matter of Example 100 can optionally include wherein receiving the notification from the current network that specifies the incoming call includes receiving a connected mode notification message for the incoming call from the current network.

In Example 103, the subject matter of any one of Examples 87 to 99 can optionally include wherein the pending circuit-switched order is an outgoing call, and wherein identifying the pending circuit-switched order supported by the combined CS-PS network while attached to the current network includes receiving input from a user that triggers the outgoing call.

In Example 104, the subject matter of any one of Examples 87 to 103 can optionally include the method further including performing an initial attempt to switch from the current network to the combined CS-PS network under the guidance of the current network, wherein switching from the current network to the combined CS-PS network to engage in the pending circuit-switched order using a selected cell of the one or more cells includes when the initial attempt to switch from the current network to the combined CS-PS network fails, switching from the current network to the combined CS-PS network to engage in the pending circuit-switched order using the selected cell.

In Example 105, the subject matter of Example 104 can optionally include wherein performing the initial attempt to switch from the current network to the combined CS-PS network under the guidance of the current network includes attempting to perform Circuit-Switched Fallback (CSFB) from the current network to the combined CS-PS network for the pending circuit-switched order.

In Example 106, the subject matter of Example 104 can optionally include wherein performing the initial attempt to switch from the current network to the combined CS-PS network under the guidance of the current network includes transmitting an Extended Service Request for the pending circuit-switched order to the current network.

In Example 107, the subject matter of Example 106 can optionally include the method further including determining that the initial attempt has failed if no response is received for the Extended Service Request within a finite time period or if a failure notification is received.

In Example 108, the subject matter of any one of Examples 87 to 107 can optionally include wherein switching from the current network to the combined CS-PS network to engage in the pending circuit-switched order using the selected cell of the one or more cells includes performing cell reselection from a current serving cell of the current network to the selected cell.

In Example 109, the subject matter of any one of Examples 87 to 108 can optionally include wherein the current network is a different radio access technology than the combined CS-PS network.

In Example 110, the subject matter of any one of Examples 87 to 109 can optionally include wherein the current network does not support the circuit-switched order.

In Example 111, the subject matter of any one of Examples 87 to 110 can optionally include wherein the current network is a Long Term Evolution (LTE) network and the combined CS-PS network is a Global System for Mobile Communications (GSM) network or a Universal Mobile Telecommunications System (UMTS) network.

In Example 112, the subject matter of any one of Examples 87 to 111 can optionally include wherein performing the radio measurement to identify the one or more cells of the combined CS-PS network in anticipation of circuit-switched orders includes performing inter-radio access technology (inter-RAT) radio measurement on the combined CS-PS network while attached to the current network to identify the one or more cells.

In Example 113, the subject matter of Example 112 can optionally include wherein performing the inter-radio access technology (inter-RAT) radio measurement on the combined CS-PS network while attached to the current network to identify the one or more cells includes performing the inter-RAT radio measurement in connected mode or idle mode.

All acronyms defined in the above description additionally hold in all claims included herein.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A radio communication device comprising:
a measurement circuit configured to perform radio measurements to identify one or more cells supporting circuit-switched communications of a combined circuit-switched packet-switched (CS-PS) network in anticipation of circuit-switched orders; and
a control circuit configured to:
identify a pending circuit-switched order supported by the combined CS-PS network while attached to a current packet-switched network; and
switch from the current packet-switched network to the combined CS-PS network to engage in the pending circuit-switched order using a selected cell of the one or more cells,
wherein the control circuit triggers the measurement circuit to perform the radio measurements to identify the one or more cells supporting circuit-switched communications of the combined CS-PS network upon the radio communication device switching to a new serving cell of the current packet-switched network.

2. The radio communication device of claim 1, wherein the measurement circuit is configured to perform the radio measurements to identify the one or more cells supporting circuit-switched communications of the combined CS-PS network in anticipation of circuit-switched orders by:
processing radio signals received from the combined CS-PS network to obtain one or more radio measurements and one or more cell parameters for each of the one or more cells,
the control circuit further configured to select the selected cell from the one or more cells by applying a selection criteria to the one or more radio measurements and the one or more cell parameters of the one or more cells.

3. The radio communication device of claim 2, wherein the selection criteria is dependent on one or more of received signal strength, received signal quality, network identity, or location information.

4. The radio communication device of claim 1, wherein the control circuit is further configured to:
identify one or more first cells from the one or more cells that have matching location information to a current serving cell; and
select the selected cell from the one or more first cells.

5. The radio communication device of claim 4, wherein the control circuit is configured to identify the one or more first cells from the one or more cells that have matching location identity information to the current serving cell by:
identifying a Location Area (LA) corresponding to the current serving cell; and
identifying one or more of the one or more cells belong to the LA as the one or more first cells.

6. The radio communication device of claim 1, wherein the pending circuit-switched order is an incoming call, and wherein the control circuit is configured to identify the pending circuit-switched order supported by the combined CS-PS network while attached to the current packet-switched network by:
receiving a notification from the current packet-switched network that specifies the incoming call.

7. The radio communication device of claim 1, wherein the pending circuit-switched order is an outgoing call, and wherein the control circuit is configured to identify the pending circuit-switched order supported by the combined CS-PS network while attached to the current packet-switched network by:
receiving input from a user that triggers the outgoing call.

8. The radio communication device of claim 1, wherein the control circuit is further configured to:
perform an initial attempt to switch from the current packet-switched network to the combined CS-PS network under guidance of the current packet-switched network,
and wherein the control circuit is configured to switch from the current packet-switched network to the combined CS-PS network to engage in the pending circuit-switched order using a selected cell of the one or more cells by:
when the initial attempt to switch from the current packet-switched network to the combined CS-PS network fails, switching from the current packet-switched network to the combined CS-PS network to engage in the pending circuit-switched order using the selected cell.

9. The radio communication device of claim 8, wherein the control circuit is configured to perform the initial attempt to switch from the current packet-switched network to the combined CS-PS network under guidance of the current packet-switched network by:
    attempting to perform Circuit-Switched Fallback (CSFB) from the current packet-switched network to the combined CS-PS network for the pending circuit-switched order.

10. The radio communication device of claim 8, wherein the control circuit is configured to perform the initial attempt to switch from the current packet-switched network to the combined CS-PS network under guidance of the current packet-switched network by:
    transmitting an Extended Service Request for the pending circuit-switched order to the current packet-switched network.

11. The radio communication device of claim 1, wherein the control circuit is configured to switch from the current packet-switched network to the combined CS-PS network to engage in the pending circuit-switched order using the selected cell of the one or more cells by:
    performing cell reselection from a current serving cell of the current packet-switched network to the selected cell.

12. The radio communication device of claim 1, wherein the current packet-switched network does not support the circuit-switched order.

13. The radio communication device of claim 1, wherein the measurement circuit is configured to perform the radio measurements to identify the one or more cells supporting circuit-switched communications of the combined CS-PS network in anticipation of circuit-switched orders by:
    performing inter-radio access technology (inter-RAT) radio measurements on the combined CS-PS network while attached to the current packet-switched network to identify the one or more cells.

14. A non-transitory computer readable medium storing instructions that when executed by a controller of a radio communication device control the radio communication device to perform a method comprising:
    performing radio measurements to identify one or more cells supporting circuit-switched communications of a combined circuit-switched packet-switched (CS-PS) network in anticipation of circuit-switched orders;
    identifying a pending circuit-switched order supported by the combined CS-PS network while attached to a current packet-switched network; and
    switching from the current packet-switched network to the combined CS-PS network to engage in the pending circuit-switched order using a selected cell of the one or more cells,
wherein the performing of the radio measurements to identify the one or more cells supporting circuit-switched communications of the combined CS-PS network is triggered upon the radio communication device switching to a new serving cell of the current packet-switched network.

15. The non-transitory computer readable medium of claim 14, wherein performing the radio measurements to identify the one or more cells supporting circuit-switched communications of the combined CS-PS network in anticipation of circuit-switched orders comprises:
    processing radio signals received from the combined CS-PS network to obtain one or more radio measurements and one or more cell parameters for each of the one or more cells,
    the method further comprising selecting the selected cell from the one or more cells by applying a selection criteria to the one or more radio measurements and the one or more cell parameters of the one or more cells.

16. The non-transitory computer readable medium of claim 15, wherein the selection criteria is dependent on one or more of received signal strength, received signal quality, network identity, or location information.

17. The non-transitory computer readable medium of claim 14, wherein the method further comprises:
    identifying one or more first cells from the one or more cells that have matching location information to a current serving cell; and
    selecting the selected cell from the one or more first cells.

18. The non-transitory computer readable medium of claim 17, wherein identifying the one or more first cells from the one or more cells that have matching location identity information to the current serving cell comprises:
    identifying a Location Area (LA) corresponding to the current serving cell; and
    identifying one or more of the one or more cells belong to the LA as the one or more first cells.

19. The non-transitory computer readable medium of claim 14, the method further comprising:
    performing an initial attempt to switch from the current packet-switched network to the combined CS-PS network under guidance of the current packet-switched network,
    wherein switching from the current packet-switched network to the combined CS-PS network to engage in the pending circuit-switched order using a selected cell of the one or more cells comprises:
    when the initial attempt to switch from the current packet-switched network to the combined CS-PS network fails, switching from the current packet-switched network to the combined CS-PS network to engage in the pending circuit-switched order using the selected cell.

20. The non-transitory computer readable medium of claim 19, wherein performing the initial attempt to switch from the current packet-switched network to the combined CS-PS network under guidance of the current packet-switched network comprises:
    attempting to perform Circuit-Switched Fallback (CSFB) from the current packet-switched network to the combined CS-PS network for the pending circuit-switched order.

21. The non-transitory computer readable medium of claim 14, wherein switching from the current packet-switched network to the combined CS-PS network to engage in the pending circuit-switched order using the selected cell of the one or more cells comprises:
    performing cell reselection from a current serving cell of the current packet-switched network to the selected cell.

22. The non-transitory computer readable medium of claim 14, wherein the current packet-switched network does not support the circuit-switched order.

23. A method for a radio communication device to perform radio communications, the method comprising:
    performing radio measurements to identify one or more cells supporting circuit-switched communications of a combined circuit-switched packet-switched (CS-PS) network in anticipation of circuit-switched orders;
    identifying a pending circuit-switched order supported by the combined CS-PS network while attached to a current packet-switched network; and switching from the current packet-switched network to the combined CS-PS network to engage in the pending circuit-switched order using a selected cell of the one or more cells, wherein the performing of the radio measurements to identify the one or more cells supporting circuit-switched communications of the combined CS-PS network is triggered upon the radio communication device switching to a new serving cell of the current packet-switched network.

24. The method of claim 23, further comprising:
performing an initial attempt to switch from the current packet-switched network to the combined CS-PS network under guidance of the current packet-switched network, wherein switching from the current packet-switched network to the combined CS-PS network to engage in the pending circuit-switched order using a selected cell of the one or more cells comprises:

when the initial attempt to switch from the current packet-switched network to the combined CS-PS network fails, switching from the current packet-switched network to the combined CS-PS network to engage in the pending circuit-switched order using the selected cell.

25. The method of claim 24, wherein performing the initial attempt to switch from the current packet-switched network to the combined CS-PS network under guidance of the current packet-switched network comprises:

attempting to perform Circuit-Switched Fallback (CSFB) from the current packet-switched network to the combined CS-PS network for the pending circuit-switched order.

* * * * *